US012504153B2

(12) United States Patent
Wright et al.

(10) Patent No.: US 12,504,153 B2
(45) Date of Patent: Dec. 23, 2025

(54) TRIM RETENTION ASSEMBLIES FOR RECESSED LUMINAIRES

(71) Applicant: SIGNIFY HOLDING B.V., Eindhoven (NL)

(72) Inventors: Timothy Glenn Wright, Peachtree City, GA (US); Jay Paul Bokros, Senoia, GA (US); Jason Quentin Paulsel, Peachtree City, GA (US); Jared Michael Davis, Newnan, GA (US); Pradip Vilasrao Jogdand, Pune (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/834,735

(22) PCT Filed: Jan. 27, 2023

(86) PCT No.: PCT/EP2023/052021
§ 371 (c)(1),
(2) Date: Jul. 31, 2024

(87) PCT Pub. No.: WO2023/148098
PCT Pub. Date: Aug. 10, 2023

(65) Prior Publication Data

US 2025/0137621 A1 May 1, 2025

Related U.S. Application Data

(60) Provisional application No. 63/306,292, filed on Feb. 3, 2022.

(30) Foreign Application Priority Data

Feb. 25, 2022 (EP) .................................... 22158881

(51) Int. Cl.
*F21V 17/16* (2006.01)
*F21S 8/02* (2006.01)
*F21V 17/00* (2006.01)
*F21V 17/10* (2006.01)
*F21V 21/04* (2006.01)

(52) U.S. Cl.
CPC ............ *F21V 17/16* (2013.01); *F21V 17/005* (2013.01); *F21V 17/105* (2013.01); *F21S 8/02* (2013.01);
(Continued)

(58) Field of Classification Search
CPC ...... F21V 21/04; F21V 21/041; F21V 21/042; F21V 21/043; F21V 21/044;
(Continued)

(56) References Cited

U.S. PATENT DOCUMENTS 2,728,849 A 12/1955 Beber et al.
3,099,404 A 7/1963 Kaufman et al.
(Continued)

*Primary Examiner* — Colin J Cattanach

(57) ABSTRACT

A trim retention assembly (280) for a recessed luminaire (100) comprising a—retention device anchor (328) and a retention device retaining feature (329) both disposed in the recessed luminaire (100), —retention device coupling feature (755) disposed on a trim (749), and—retention device (330) having a—luminaire anchor (335), —resilient feature (334), —luminaire retention feature (333), and—trim coupling feature (331), where the i) luminaire anchor is coupled to the retention device anchor, ii) trim coupling feature is coupled to the retention device coupling feature, iii) resilient feature has a loaded position and an unloaded position, iv) retention device retaining feature holds the resilient feature in the loaded position, v) trim coupling feature is disposed below a structure (159) when the resilient feature is in the loaded position, and vi) resilient feature pulls the trim against the structure when resilient feature is in the unloaded position.

15 Claims, 22 Drawing Sheets

(52) U.S. Cl.
CPC ................ *F21S 8/022* (2013.01); *F21S 8/024* (2013.01); *F21S 8/026* (2013.01); *F21S 8/028* (2013.01); *F21V 17/162* (2013.01); *F21V 17/166* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01)

(58) Field of Classification Search
CPC .... F21V 21/045; F21V 21/046; F21V 21/047; F21V 21/048; F21V 21/049; F21V 17/166; F21V 17/162; F21S 8/02; F21S 8/022; F21S 8/024; F21S 8/026; F21S 8/028
See application file for complete search history.

(56) References Cited

U.S. PATENT DOCUMENTS

| | | | | |
|---|---|---|---|---|
| 3,370,164 | A * | 2/1968 | Green ..................... | F21V 17/10 362/322 |
| 3,560,732 | A * | 2/1971 | Green ....................... | F21S 8/02 362/451 |
| 3,644,729 | A * | 2/1972 | McFarlin .............. | F21V 17/107 220/315 |
| 5,868,493 | A | 2/1999 | Winkelhake | |
| 6,588,922 | B1 | 7/2003 | DeCicco | |
| 7,909,487 | B1 | 3/2011 | Venetucci et al. | |
| 2007/0047241 | A1 | 3/2007 | Fryzek et al. | |
| 2015/0131296 | A1* | 5/2015 | O'Brien-Bernini .......................... | F21V 31/005 362/310 |
| 2019/0301710 | A1 | 10/2019 | Harris et al. | |
| 2020/0063946 | A1 | 2/2020 | Paulsel et al. | |

* cited by examiner

FIG. 14C
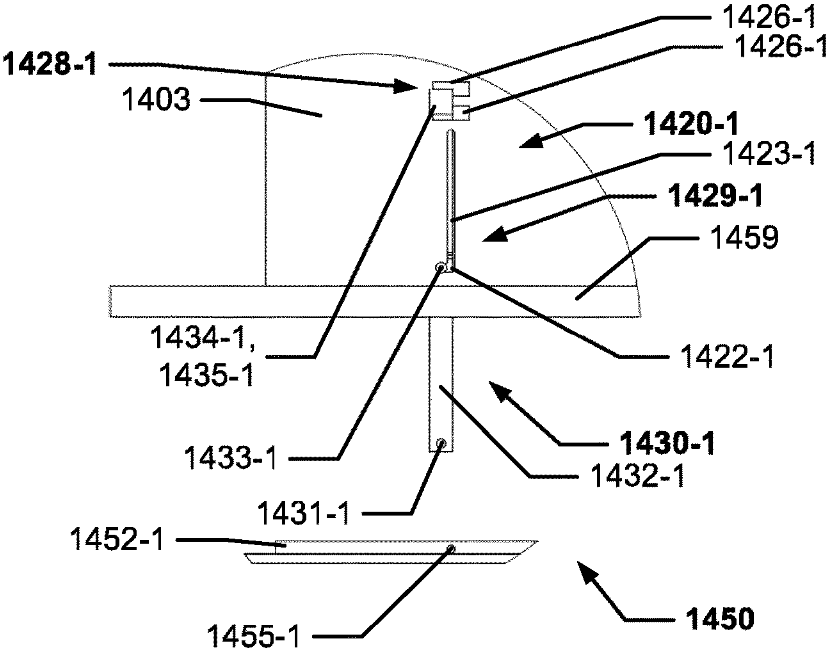
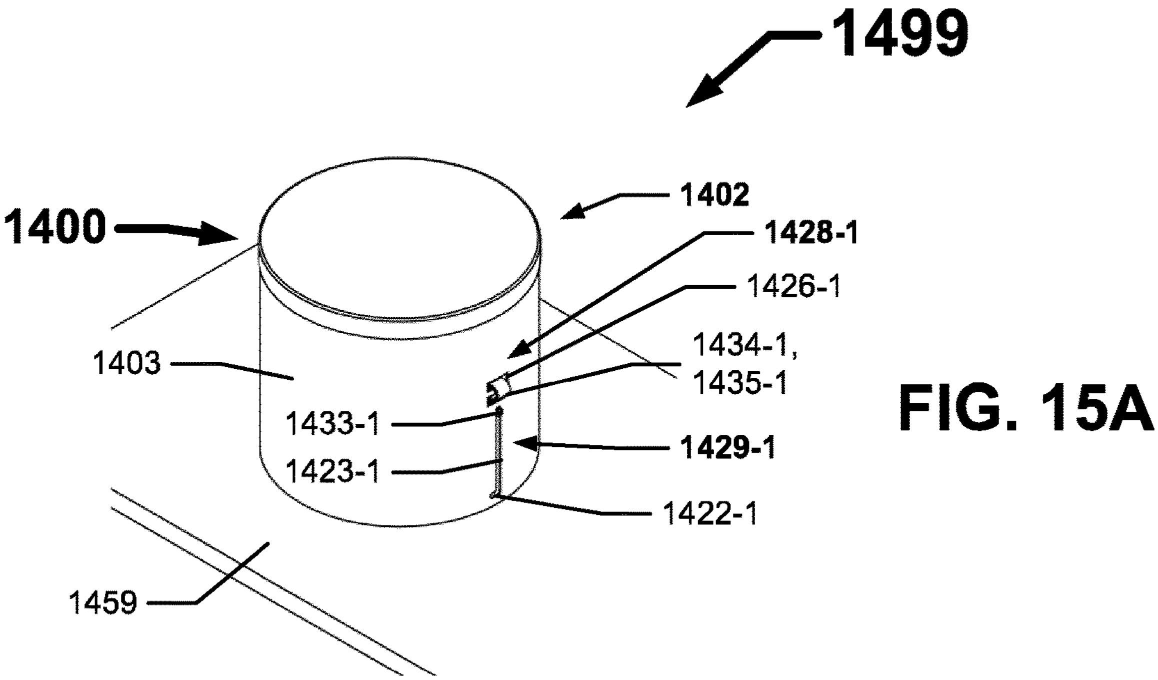
FIG. 15A

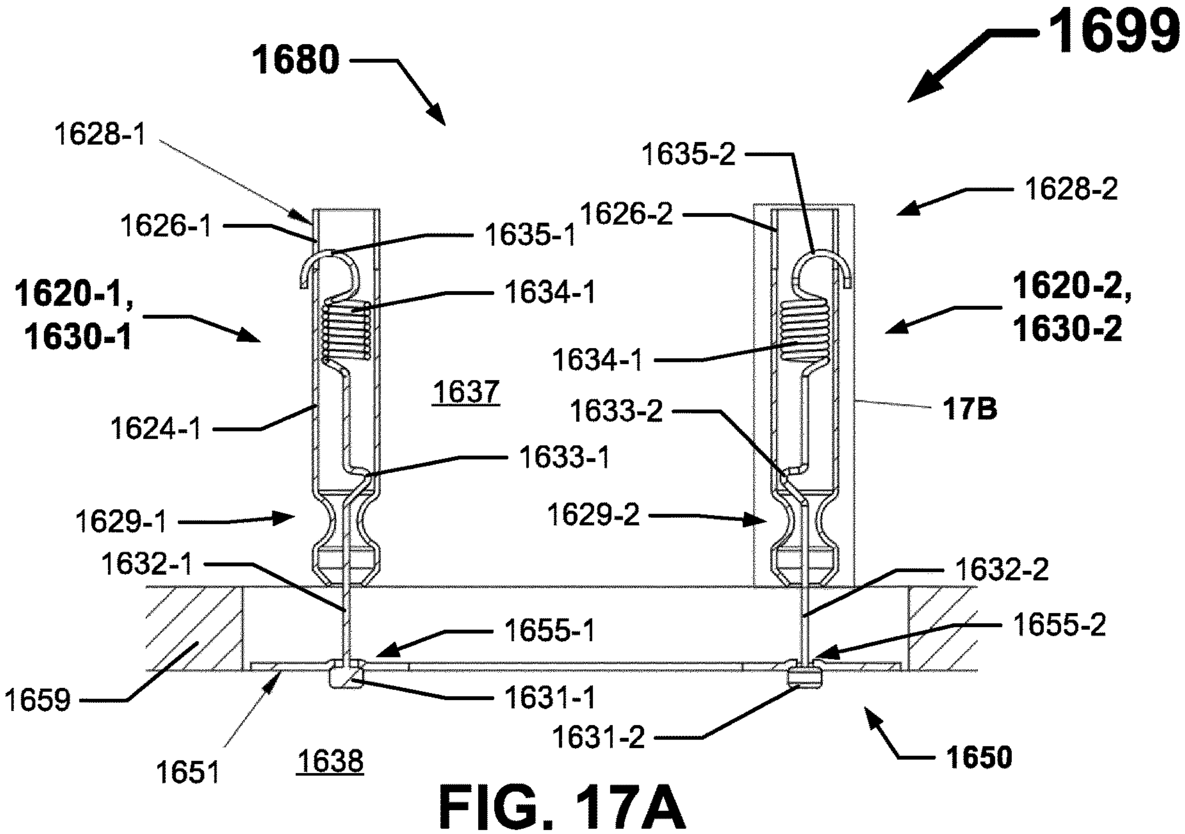
FIG. 17A
FIG. 17B
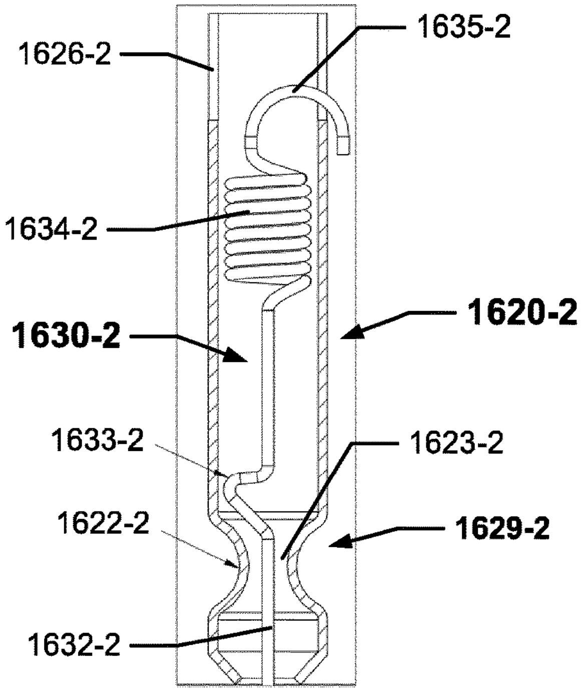

TRIM RETENTION ASSEMBLIES FOR RECESSED LUMINAIRES

CROSS-REFERENCE TO PRIOR APPLICATIONS

This application is the U.S. National Phase application under 35 U.S.C. § 371 of International Application No. PCT/EP2023/052021, filed on Jan. 27, 2023, which claims the benefit of both European Patent Application No. 22158881.7, filed on Feb. 25, 2022, and U.S. Provisional Application No. 63/306,292, filed on Feb. 3, 2022. These applications are hereby incorporated by reference herein.

TECHNICAL FIELD

The present disclosure relates generally to recessed luminaires, and more particularly to systems, methods, and devices for trim retention assemblies for recessed luminaires.

BACKGROUND

Recessed luminaires are mostly hidden from view once installed, with most of a recessed luminaire being positioned above a ceiling or other part of a structure. However, the bottom or distal end of a recessed luminaire is visible. Often, the visible part of a recessed luminaire is the trim. A user may want to have a trim with certain characteristics (e.g., shape, size, color). However, changing out a trim for an installed luminaire can be cumbersome and require the recessed luminaire to be uninstalled, which results in the time consuming, destructive, and labor-intensive process of ripping down and repairing the ceiling. U.S. Pat. No. 2,728,849 discloses a recessed lighting fixture having a closure pivotally connected to a lighting fixture housing by a link and bracket, where a lock and stop means releasably locks the link and closure in an open position relative to the light fixture housing, and where manipulation of the closure in a predetermined manner will release the link to return to the link and closure to a closed position which is aided by a spring attached to the link.

SUMMARY

In general, in one aspect, the disclosure relates to a trim retention assembly for a recessed luminaire. The trim retention assembly can include a retention device anchor disposed in the recessed luminaire, a retention device retaining feature disposed in the recessed luminaire, and a retention device coupling feature disposed on a trim. The trim retention assembly can also include a retention device having a luminaire anchor, a resilient feature, a luminaire retention feature, and a trim coupling feature, where the luminaire anchor is coupled to the retention device anchor, where the trim coupling feature is coupled to the retention device coupling feature, where the resilient feature has a loaded position and an unloaded position, where the retention device retaining feature holds the resilient feature in the loaded position, where the trim coupling feature is disposed below a structure when the resilient feature is in the loaded position, thereby allowing the trim coupling feature to become coupled to the retention device coupling feature, and where the resilient feature pulls the trim against the structure when resilient feature is in the unloaded position.

In another aspect, the disclosure relates to a recessed luminaire mounted to a structure. The recessed luminaire can include a housing having a housing wall that forms a cavity therein. The recessed luminaire can also include a trim assembly having a trim and a retention device coupling feature disposed on the trim collar. The recessed luminaire can further include a trim retention assembly having a retention device anchor disposed in the cavity of the housing. The trim retention assembly can also include a retention device retaining feature disposed in the cavity of the housing. The trim retention assembly can further include a retention device disposed in the cavity of the housing, where the retention device includes a luminaire anchor, a resilient feature, a luminaire retention feature, and a trim coupling feature, where the luminaire anchor is coupled to the retention device anchor, where the trim coupling feature is coupled to the retention device coupling feature, where the resilient feature has a loaded position and an unloaded position, where the retention device retaining feature holds the resilient feature in the loaded position, thereby allowing the trim coupling feature to become coupled to the retention device coupling feature, and where the resilient feature pulls the trim against the structure when resilient feature is in the unloaded position.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 14A through 14C show various views of a system that includes another trim retention assembly in the loaded position according to certain example embodiments.

FIGS. 15A through 15E show various views of the system of FIGS. 14A through 14C with the trim retention assembly in the unloaded position according to certain example embodiments.

FIGS. 17A and 17B show various views of the system of FIGS. 16A through 16G with the trim retention assembly in the unloaded position according to certain example embodiments.

DETAILED DESCRIPTION

Figure 1A:
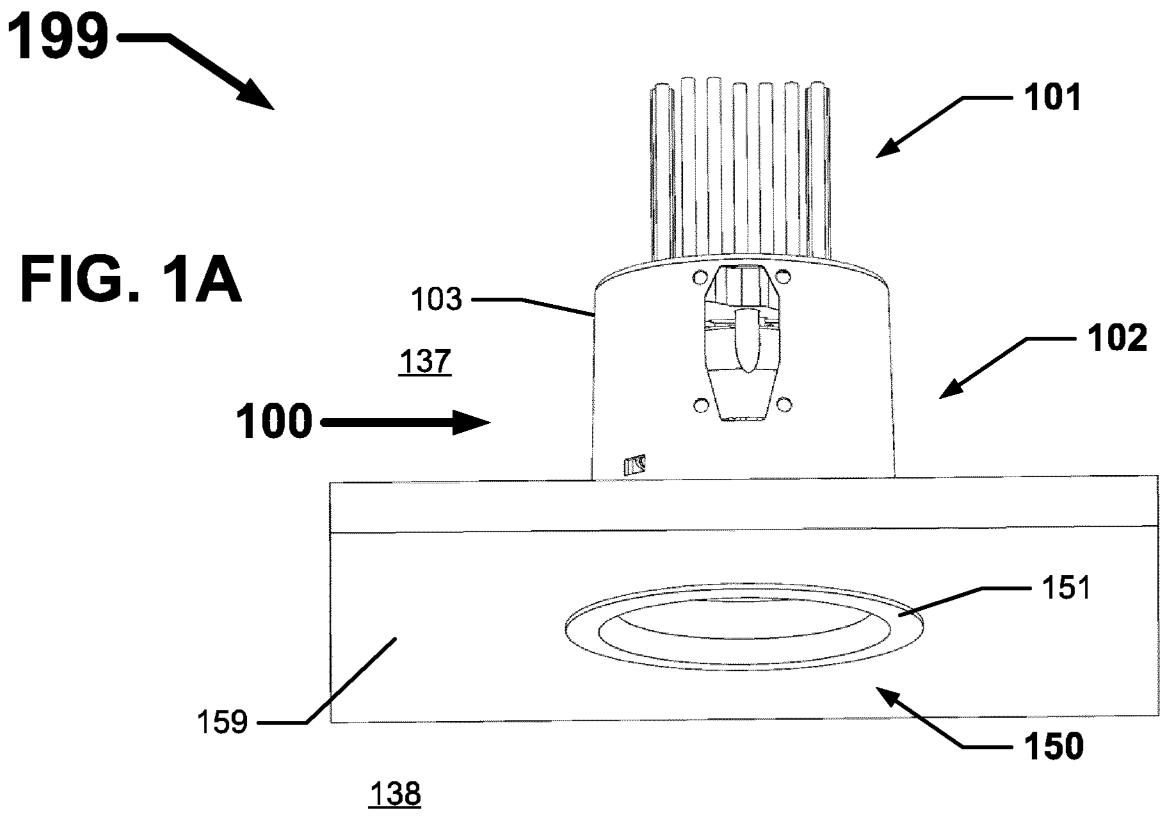
FIGS. 1A and 1B show a system that includes a recessed luminaire installed in a structure according to certain example embodiments.

In general, example embodiments provide systems, methods, and devices for trim retention assemblies for recessed luminaires. Example embodiments can provide a number of benefits. Such benefits can include, but are not limited to, fewer parts to keep in inventory, modularity, user control, easy interchangeability of trims, and tool-less configurability. Example embodiments can be used with new recessed luminaires or retrofit with existing recessed luminaires. Example embodiments described herein can be used with recessed luminaires having any of a number of sizes (e.g., 3 inches, 4 inches, 5 inches, 6 inches), any of a number of housing shapes (e.g., a cylinder, a rectangular cuboid), any of a number of configurations (e.g., with a can, without a can), and any shape (e.g., circular flanged, square flanged, conical flangeless, conical square flanged) of trim.

Recessed luminaires with example trim retention assemblies can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Recessed luminaires with example trim retention accessories can be integrated into any of a number of different structures. Such structures can include, but are not limited to, drywall, wood studs, concrete, and ceiling tile. A user may be any person that interacts with recessed luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Recessed luminaires with example trim retention assemblies (including portions thereof) can be made of one or more of a number of suitable materials to allow the recessed luminaire to meet certain standards and/or regulations while also maintaining durability in light of the one or more conditions under which the recessed luminaires and/or other associated components of the recessed luminaire can be exposed. Examples of such materials can include, but are not limited to, aluminum, stainless steel, fiberglass, glass, plastic, polymer, ceramic, and rubber.

Example trim retention assemblies, or portions or components thereof, described herein can be made from a single piece (as from a mold, injection mold, die cast, or extrusion process). In addition, or in the alternative, example trim retention assemblies (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example trim retention assemblies to become coupled, directly or indirectly, to one or more other components (e.g., a trim, a housing of a recessed luminaire, some other component of the recessed luminaire). A coupling feature can include, but is not limited to, a clamp, a portion of a hinge, an aperture, a recessed area, a protrusion, a hole, a slot, a tab, a detent, and mating threads. One portion of an example trim retention assembly can be coupled to a component (e.g., a trim, a housing of a recessed luminaire, some other component of the recessed luminaire) of the recessed luminaire by the direct use of one or more coupling features.

In addition, or in the alternative, a portion of an example trim retention assembly can be coupled to a component (e.g., a trim, a housing of a recessed luminaire, some other component of the recessed luminaire) of a recessed luminaire using one or more independent devices that interact with one or more coupling features disposed on a component of the trim retention assembly. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of trim retention assemblies for recessed luminaires, one or more of the components shown may be omitted, repeated, and/or substituted. Accordingly, example embodiments of trim retention assemblies for recessed luminaires should not be considered limited to the specific arrangements of components shown in any of the figures. For example, features shown in one or more figures or described with respect to one embodiment can be applied to another embodiment associated with a different figure or description.

In certain example embodiments, recessed luminaires having example trim retention assemblies are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the recessed luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of trim retention assemblies for recessed luminaires will be described more fully hereinafter with reference to the accompanying drawings, in which example embodiments of trim retention assemblies for recessed luminaires are shown. Trim retention assemblies for recessed luminaires may, however, be embodied in many different forms and should not be construed as limited to the example embodiments set forth herein. Rather, these example embodiments are provided so that this disclosure will be thorough and complete, and will fully convey the scope of trim retention assemblies for recessed luminaires to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of trim retention assemblies for recessed luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
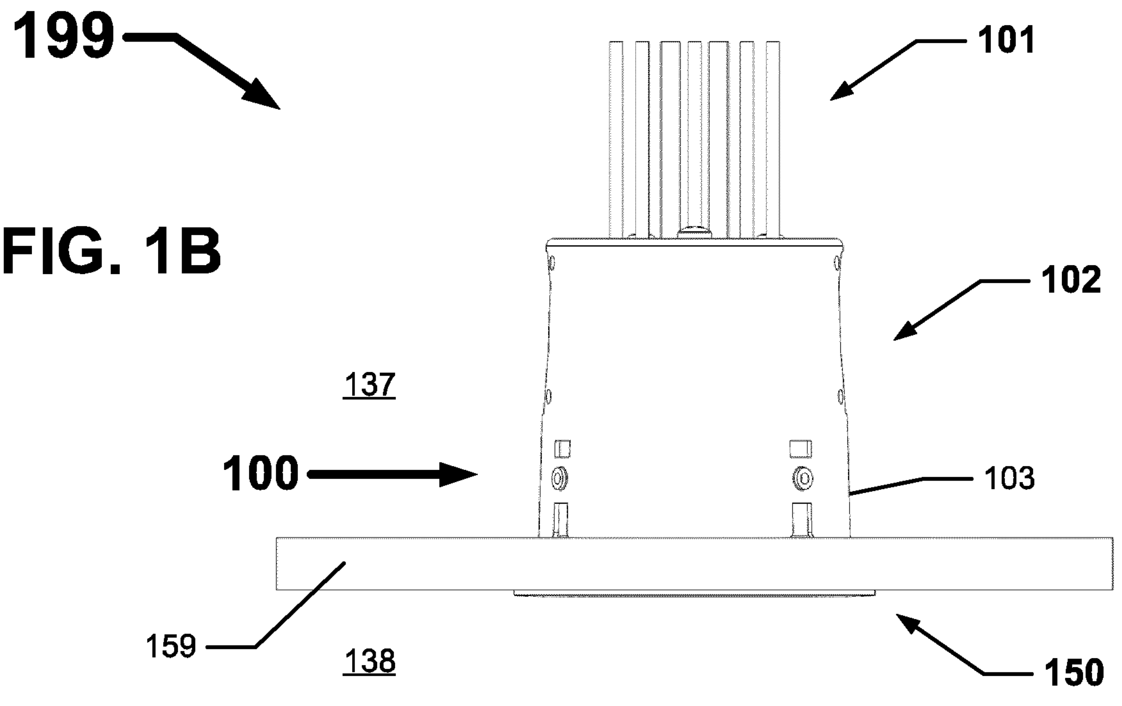

FIGS. 1A and 1B show a system 199 that includes a recessed luminaire 100 installed in a structure 159 according to certain example embodiments. Specifically, FIG. 1A shows a bottom perspective view of the system 199. FIG. 1B shows a side view of the system 199. The recessed luminaire 100 of the system 199 of FIGS. 1A and 1B is installed by being disposed in an aperture in a structure 159 (in this case, drywall in a ceiling). As a result, most of the recessed luminaire 100 is positioned in a volume of space 137 (e.g., a plenum space) above the structure 159, while the remainder (specifically, the distal part of the trim assembly 150) of the recessed luminaire 100 is in a different volume of space 138 below the structure 159.

The recessed luminaire 100 includes a number of components, including the trim assembly 150, a heat sink assembly 101, and a housing 102. The heat sink assembly 101 can serve multiple functions. For example, the heat sink assembly 101 can include an internal cavity inside of which can be housed one or more electrical components, including but not limited to a power supply (e.g., a driver) and a controller. As another example, the heat sink assembly 101 can include heat sinking material (e.g., thermally conductive metal) configured in such a way (e.g., multiple fins) to absorb heat generated by one or more heat-generating components (e.g., a driver) and dissipate the heat into the adjacent space 137 (e.g., a plenum space).

The housing 102 includes at least one housing wall 103. Within the housing wall 103 of the housing 102 is a cavity, inside of which can be disposed one or more components of the recessed luminaire 100. Such components can include, but are not limited to, one or more light sources, a reflector, a driver (or other form of power source), a controller, a power transfer device (e.g., a transformer, a rectifier), an energy storage device (e.g., a battery), electrical wiring, circuit boards, and a lens. The trim assembly 150 has a trim flange 151 that is disposed at the bottom (distal) end of the trim assembly 150. The trim flange 151 of the trim assembly 150 is configured to be disposed in the volume of space 138 in which light from the recessed luminaire 100 is directed, and the remainder of the trim assembly 150 is disposed in the volume of space 137 located in the same plane as and/or above the structure 159. More details of the trim assembly 150 is provided below with respect to FIG. 7.

Figure 2:
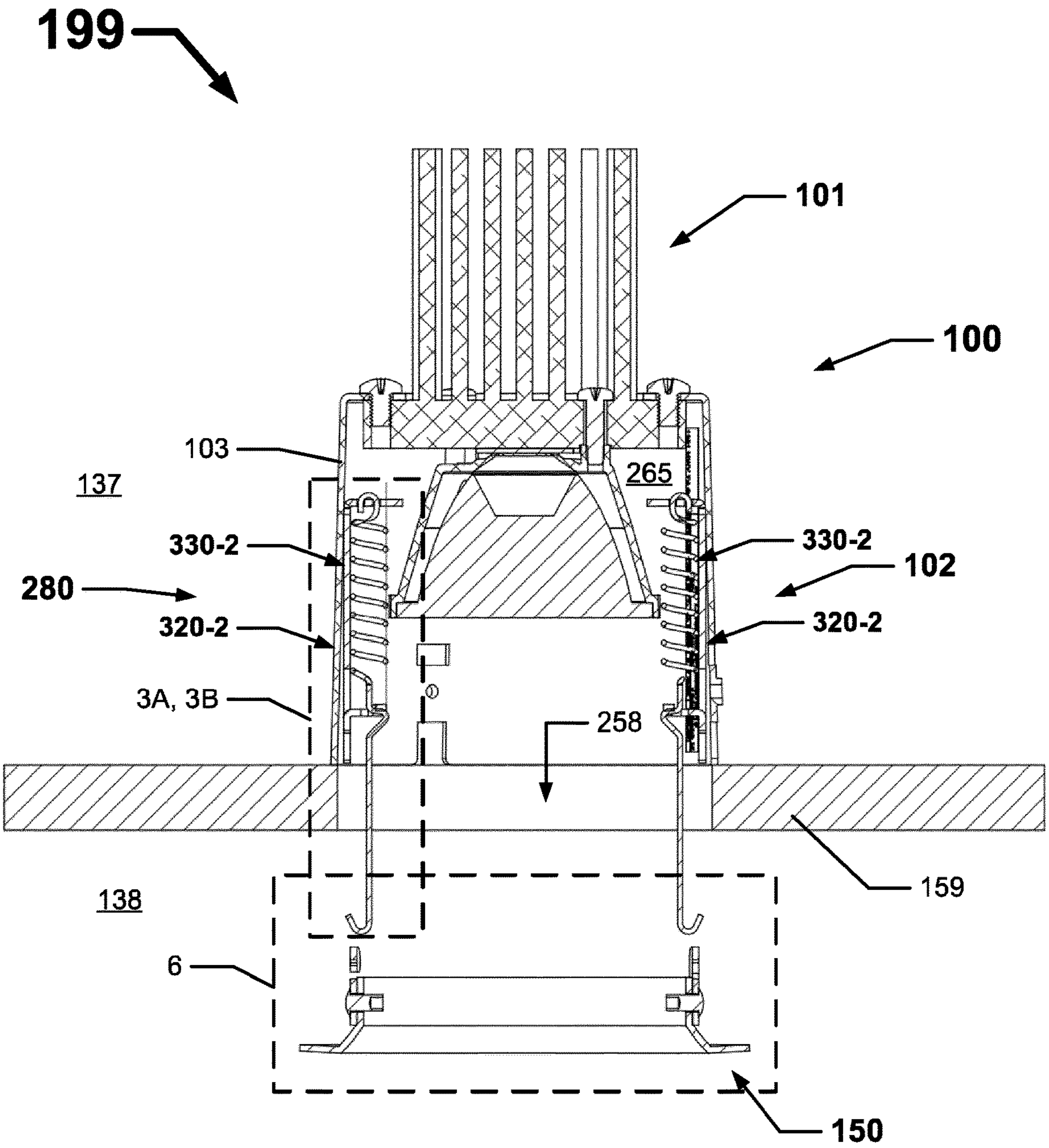
FIG. 2 shows a cross-sectional side view of the system that includes the recessed luminaire of FIGS. 1A and 1B with the trim retention assembly in the loaded position according to certain example embodiments.

FIG. 2 shows a cross-sectional side view of the system 199 that includes the recessed luminaire 100 of FIGS. 1A and 1B with the trim retention assembly 280 in the loaded position according to certain example embodiments. Referring to FIGS. 1A through 2, the system 199 of FIG. 2 shows the recessed luminaire 100 mounted in the structure 159. The trim assembly 150 and the distal end of the trim retention assembly 280 are in the volume of space 138 and are detailed in FIGS. 6 and 7 below. The rest (e.g., the heat sink assembly 101, the housing 102, the remainder of the trim retention assembly 280) of the recessed luminaire 100 is disposed in the volume of space 137 located in the same plane as and/or above the structure 159.

The trim retention assembly 280 is in the loaded position because the distal ends of the trim retention assembly 280 are disposed in the volume of space 138 below the structure 159, which makes those distal ends of the trim retention assembly 280 accessible for coupling to the trim assembly 150. The trim retention assembly 280 includes one or more (in this case, two) retention devices 330 and one or more (in this case, two) anchoring and retaining components 320. The anchoring and retaining component 320-1 and the retention device 330-1 of the trim retention assembly 280 engage with each other on one side of the cavity 265 within the housing 102, and the anchoring and retaining component 320-2 and the retention device 330-2 of the trim retention assembly 280 engage with each other on the opposite side of the cavity 265 within the housing 102.

While there are two pairs of anchoring and retaining components 320 and retention devices 330, alternative embodiments of a trim retention assembly 280 can have a single pair or more than two pairs of anchoring and retaining components 320 and retention devices 330. When the trim retention assembly 280 has multiple pairs of anchoring and retaining components 320 and retention devices 330, the multiple pairs can be distributed evenly (as in this case), randomly, or in some other fashion within the cavity 265 formed by the housing wall 103. The distal ends of the retention devices 330 extend through the aperture 258 in the structure 159 into the volume of space 138. More details about the anchoring and retaining component 320-1 and the retention device 330-1 of the trim retention assembly 280 and its various components are discussed below with respect to FIGS. 3A through 5.

Figure 3A:
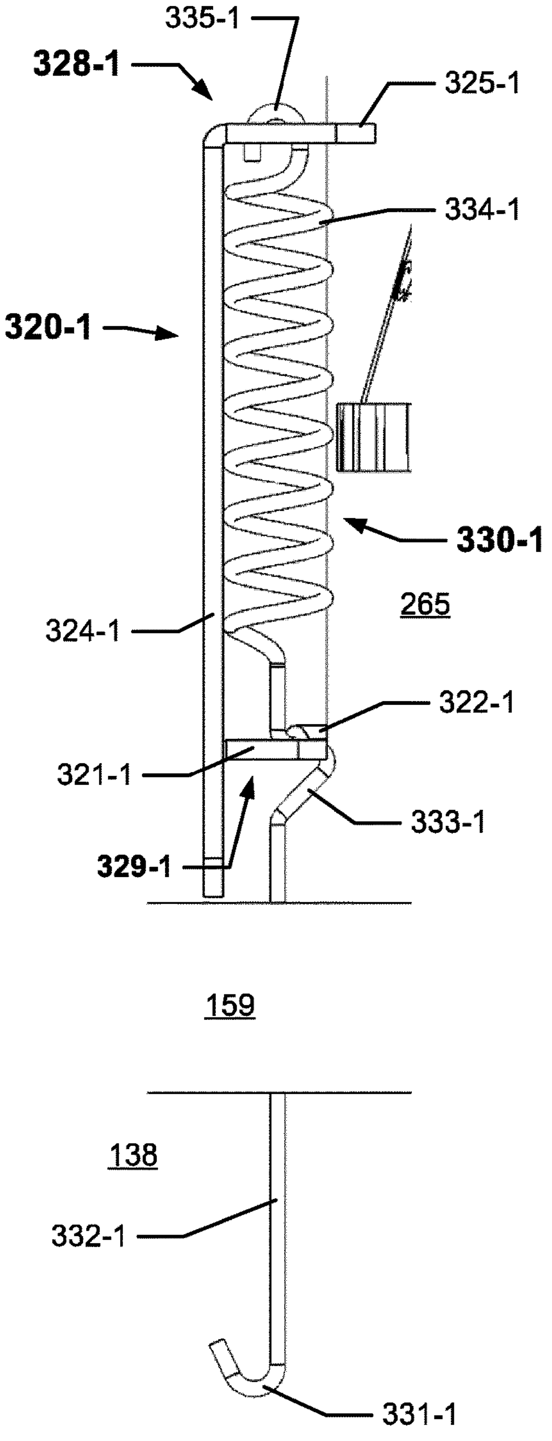
FIGS. 3A and 3B show a side and perspective view, respectively, of a subassembly of the trim retention assembly of FIG. 2 according to certain example embodiments.
Figure 3B:
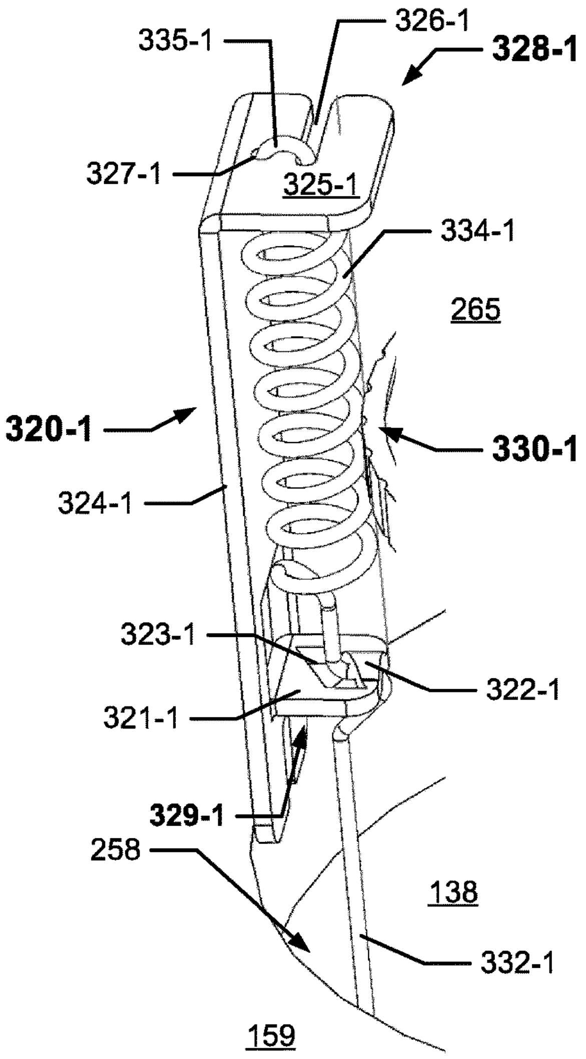
Figure 4A:
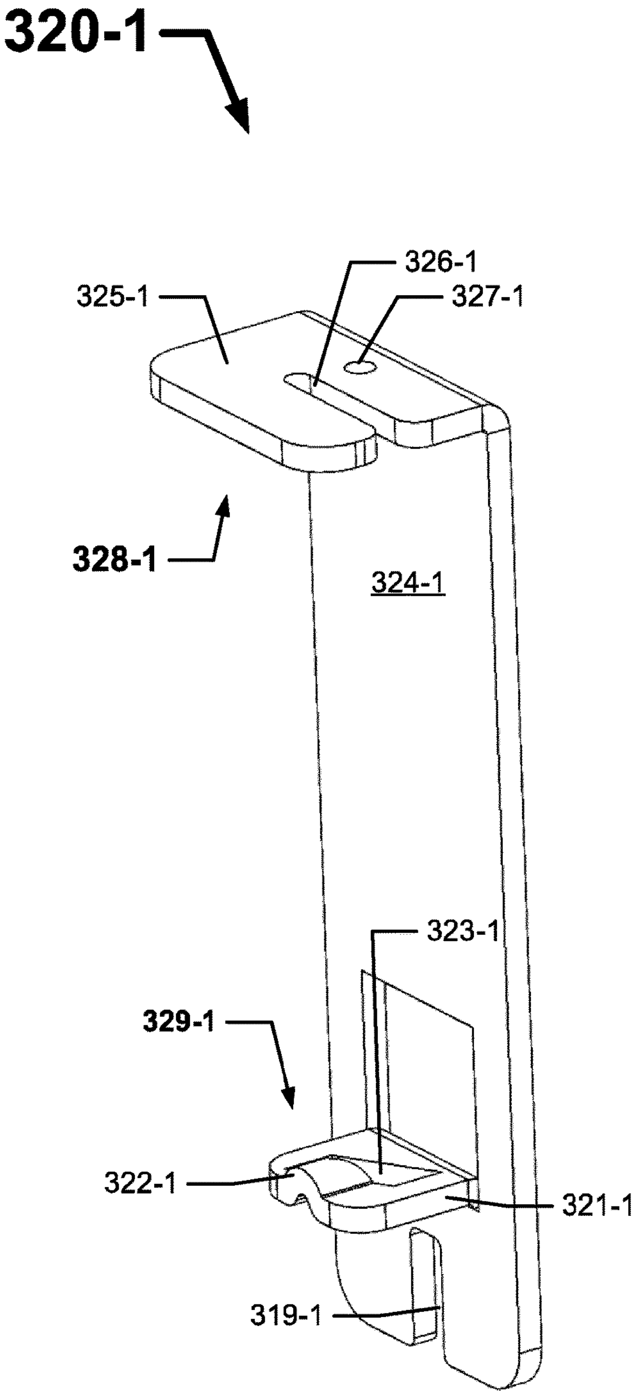
FIGS. 4A and 4B show the anchoring and retaining component of the subassembly of the trim retention assembly of FIGS. 3A and 3B according to certain example embodiments.
Figure 4B:
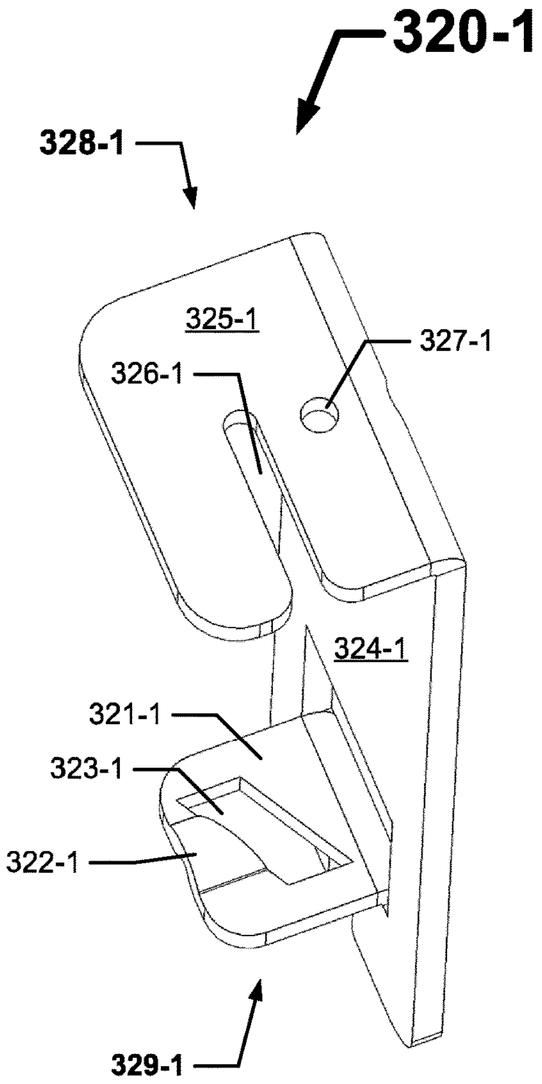
Figure 5:
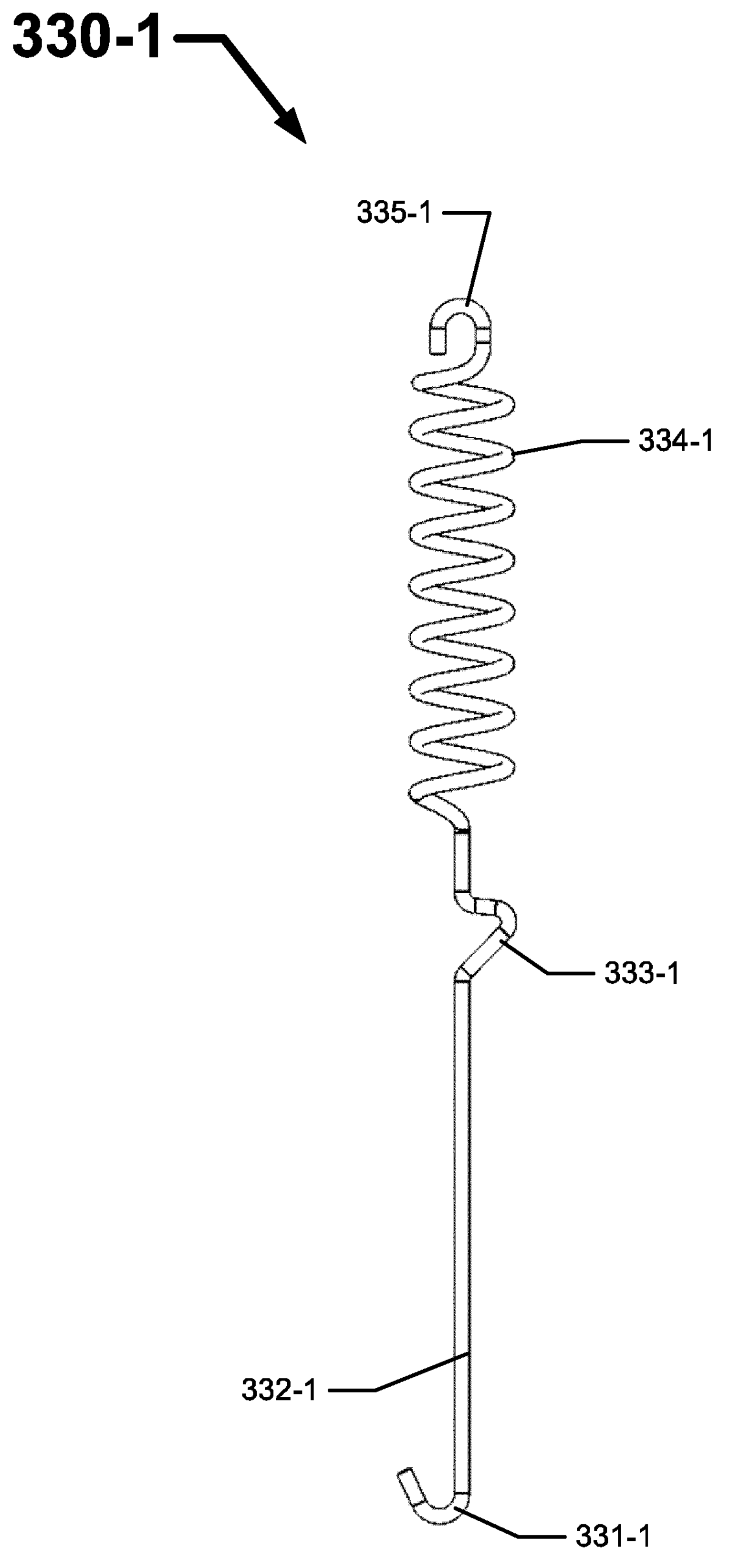
FIG. 5 shows the retention device of the trim retention assembly of FIGS. 3A and 3B according to certain example embodiments.

FIGS. 3A and 3B show a side and perspective view, respectively, of a subassembly of the trim retention assembly 280 of FIG. 2 according to certain example embodiments. The subassembly of FIGS. 3A and 3B does not include the housing 102. FIGS. 4A and 4B show the anchoring and retaining component 320-1 of the subassembly of the trim retention assembly of FIGS. 3A and 3B according to certain example embodiments. FIG. 5 shows the retention device 330-1 of the trim retention assembly of FIGS. 3A and 3B according to certain example embodiments.

Referring to FIGS. 1A through 5, the subassembly of FIGS. 3A and 3B includes the anchoring and retaining component 320-1 and the retention device 330-1. The anchoring and retaining component 320-2 and the retention device 330-2 of the trim retention assembly 280 of FIG. 2 are not included in FIGS. 3A and 3B. In this case, the configurations and features of the anchoring and retaining component 320-1 and the anchoring and retaining component 320-2 are substantially the same as the other, and the configurations and features of the retention device 330-1 and the retention device 330-2 are substantially the same as the other.

In alternative embodiments, one or more of the configurations and/or features of the anchoring and retaining component 320-1 are different than the corresponding configurations and/or features of the anchoring and retaining component 320-2 of the trim retention assembly 280. Similarly, in alternative embodiments, one or more of the configurations and/or features of the retention device 330-1 are different than the corresponding configurations and/or features of the retention device 330-2 of the trim retention assembly 280.

The anchoring and retaining component 320-1 can include one or more components and/or features. For example, in this case, as shown in FIGS. 4A and 4B, the anchoring and retaining component 320-1 includes a body 324-1, a retention device anchor 328-1 disposed toward the top of the body 324-1, and a retention device retaining feature 329-1 disposed toward the bottom of the body 324-1. The body 324-1 in this case is in the form of an upside-down L-shaped bracket that is coupled (in this case, fixedly) to the housing wall 103 of the housing 102. While the retention device anchor 328-1 and the retention device retaining feature 329-1 are part of the same component in this case, a retention device anchor 328 and/or a retention device retaining feature 329 can be an independent component or can be part of another component (e.g., part of a retention device 330 or portion thereof) in alternative embodiments.

In certain example embodiments, the retention device anchor 328-1 is configured to couple to the luminaire anchor 335-1 of the retention device 330-1. More specifically, the retention device anchor 328-1 is configured to maintain the luminaire anchor 335-1 of the retention device 330-1 in a substantially fixed position as the retention device 330-1 (and so the trim retention assembly 280) moves from an unloaded position to a loaded position, is maintained in the loaded position for a period of time, and subsequently moves from the loaded position to the unloaded position. The retention device anchor 328-1 can also be configured to repeat this cycle multiple times, depending on a number of factors, including but not limited to how often a user changes part (e.g., the trim flange 151) of the trim assembly 150 and how often the user needs to access other components of the recessed luminaire 100 that are located within the cavity 265 of the housing 102.

To accomplish this function, the retention device anchor 328-1 can include one or more features, including one or more coupling features. In this example, the retention device anchor 328-1 includes a body 325-1 that has a coupling feature 327-1 disposed thereon and a receiving feature 326-1 disposed thereon. The coupling feature 327-1 in this case is an aperture that traverses the thickness of the body 325-1. The characteristics (e.g., shape, size) of the coupling feature 327-1 are configured to complement and couple to (in this case, receive) part of (in this case, the distal end of) the luminaire anchor 335-1 of the retention device 330-1.

The receiving feature 326-1 in this case is a linear slot that traverses the body 325-1, where the slot begins at one edge of the body 325-1 and ends proximate to the coupling feature 327-1. The characteristics (e.g., shape, size) of the receiving feature 326-1 are configured to complement, receive, and stabilize part of (in this case, the proximal end of) the luminaire anchor 335-1 of the retention device 330-1. In alternative embodiments, depending on the configuration of the coupling feature 327-1, the receiving feature 326-1 may be absent from the retention device anchor 328-1 of the anchoring and retaining component 320-2.

In certain example embodiments, the retention device retaining feature 329-1 is configured to retain the luminaire retention feature 333-1 of the retention device 330-1 for some limited period of time (e.g., a few minutes, an hour) to maintain the retention device 330-1 (and so also the trim retention assembly 280) in the loaded position. More specifically, the retention device retaining feature 329-1 is configured to receive and maintain the luminaire retention feature 333-1 of the retention device 330-1 in the loaded position for as long as a user requires it (e.g., to replace the trim, flange 151, to inspect the cavity 265). The retention device retaining feature 329-1 is also configured to allow the luminaire retention feature 333-1 of the retention device 330-1 to be released to the unloaded position when the user performs a certain action (e.g., pull down on the trim assembly 150 and rotate the trim assembly 150 counterclockwise by approximately 15°, push up on the trim assembly 150, pull down on the trim assembly 150 and release the trim assembly 150, rotate the trim assembly 150 clockwise) that directly or indirectly affects the movement and position of the luminaire retention feature 333-1 of the retention device 330-1. The retention device retaining feature 329-1 can be configured to repeat this cycle multiple times.

To accomplish this function, the retention device retaining feature 329-1 can include one or more features, including one or more coupling features. In this example, as shown in FIGS. 4A and 4B, the retention device retaining feature 329-1 includes a body 321-1 that has a coupling feature 322-1 disposed thereon and a receiving feature 323-1 disposed thereon. The coupling feature 322-1 in this case is a groove in the bottom surface of the body 321-1. The characteristics (e.g., shape, size) of the coupling feature 322-1 are configured to couple to (in this case, receive and secure) part of (in this case, the top of) the luminaire retention feature 333-1 of the retention device 330-1.

The receiving feature 323-1 in this case is an angled slot that traverses the body 321-1, where the angled slot is located adjacent to the coupling feature 322-1. The characteristics (e.g., shape, size) of the receiving feature 323-1 are configured to allow the luminaire retention feature 333-1, the extension 332-1, and the trim coupling feature 331-1 of the retention device 330-1 to pass therethrough in either direction (up or down). In alternative embodiments, depending on the configuration of the coupling feature 322-1, the receiving feature 323-1 may be absent from the retention device retaining feature 329-1 of the anchoring and retaining component 320-2.

Figure 9:
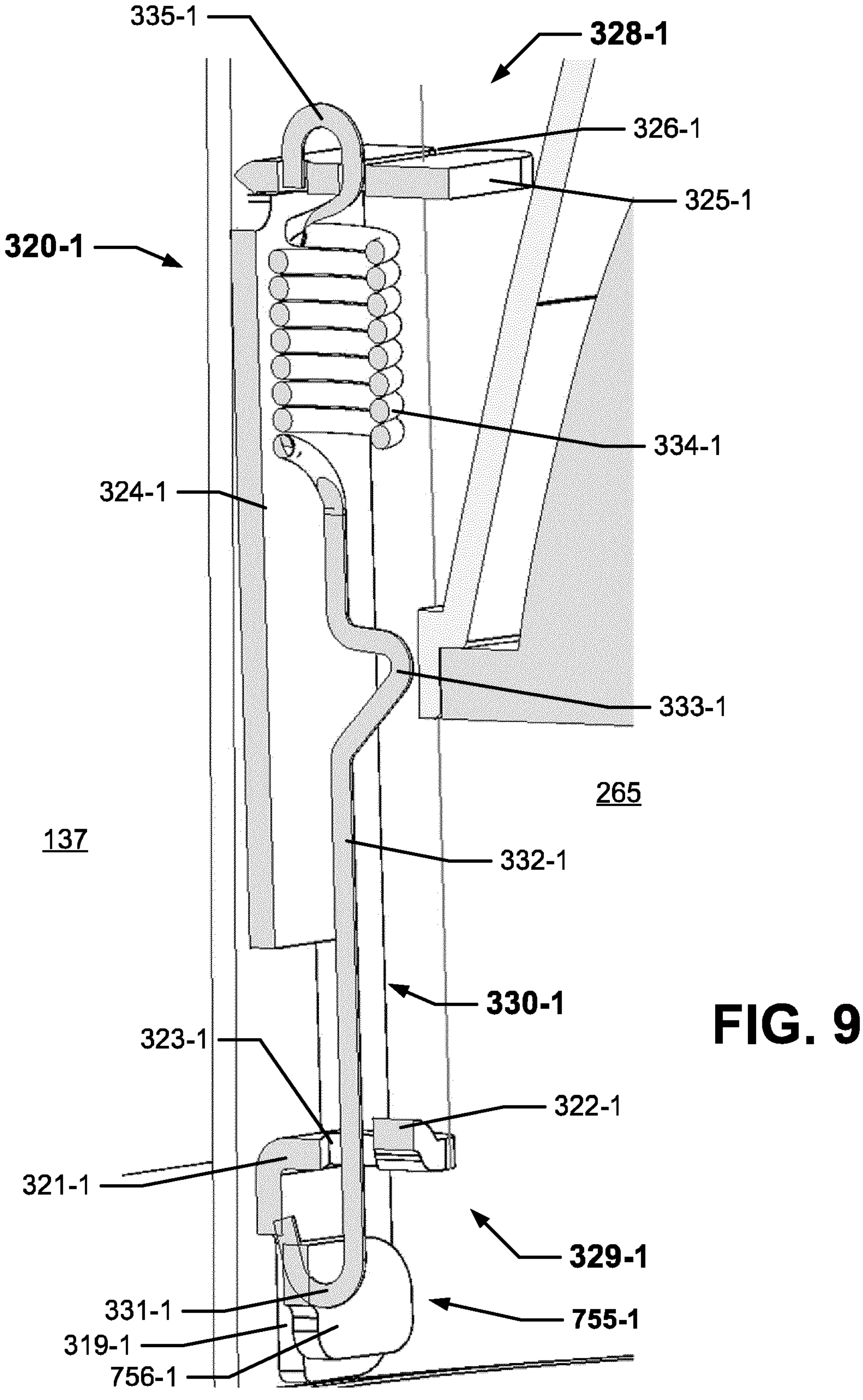
FIG. 9 shows part of the trim retention assembly of FIG. 8 according to certain example embodiments.

In some cases, the retention device retaining feature 329-1 of the anchoring and retaining component 320-2 can include one or more additional features. For example, as shown in FIG. 4A, a receiving feature 319-1 in the form of a slot can be disposed in the body 324-1 at the bottom of the anchoring and retaining component 320-2. In such a case, the receiving feature 319-1 can be used to receive part (e.g., the trim coupling feature 331-1) of the retention device 330-1, as when the retention device 330-1 is in the unloaded position, as shown in FIG. 9 below.

The retention device 330-1 can include one or more components and/or features. For example, in this case, as shown in FIG. 5, the retention device 330-1 includes the luminaire anchor 335-1, a resilient feature 334-1, the luminaire retention feature 333-1, the extension 332-1, and the trim coupling feature 331-1. In this case, the retention device 330-1 is made from a single piece, but in alternative embodiments, the retention device 330-1 can be made from multiple pieces that are coupled to each other. Also, while the various parts of the retention device 330-1 are part of the same component in this case, two or more parts (e.g., the resilient feature 334-1 and the luminaire retention feature 333-1) of the retention device 330-1 can be combined, one or more parts of the retention device 330-1 can be an independent component, and/or one or more parts of the retention device 330-1 can be part of another component (e.g., part of the anchoring and retaining component 320-2 or portion thereof) in alternative embodiments.

In certain example embodiments, the luminaire anchor 335-1 of the retention device 330-1 is configured to couple to the retention device anchor 328-1. More specifically, the luminaire anchor 335-1 of the retention device 330-1 is configured to couple to the retention device anchor 328-1 of the anchoring and retaining component 320-2 so that the luminaire anchor 335-1 is maintained in a substantially fixed position as the retention device 330-1 (and so the trim retention assembly 280) moves from an unloaded position to a loaded position, is maintained in the loaded position for a period of time, and subsequently moves from the loaded position to the unloaded position. The luminaire anchor 335-1 can also be configured to repeat this cycle multiple times.

To accomplish this function, the luminaire anchor 335-1 can include one or more features, including one or more coupling features. In this example, the luminaire anchor 335-1 is in the form of a hook. The distal end of the luminaire anchor 335-1 is configured to couple to the coupling feature 327-1 (in this case, an aperture) of the retention device anchor 328-1, and the proximal end of the luminaire anchor 335-1 is configured to be received and stabilized by the receiving feature 326-1 of the retention device anchor 328-1. The characteristics (e.g., shape, size) of the luminaire anchor 335-1 are configured to complement the various features (e.g., coupling feature 327-1) of the retention device anchor 328-1 of the anchoring and retaining component 320-2.

In certain example embodiments, the resilient feature 334-1 of the retention device 330-1 is configured to allow the retention device 330-1 to expand and contract between the unloaded position and the loaded position. When the resilient feature 334-1 is contracted (its default position), the retention device 330-1 is in the unloaded position. When the resilient feature 334-1 is expanded, the retention device 330-1 is in the loaded position. In order to expand the resilient feature 334-1 from its default position, a sufficient minimal force must be used to pull the top part (in this case, the luminaire anchor 335-1) and the bottom part (in this case, the luminaire retention feature 333-1) apart from each other.

In order to keep the resilient feature 334-1 in the loaded position, that minimal force must be maintained. As discussed above, in this example, as shown in FIGS. 3A and 3B, the retention device anchor 328-1 of the anchoring and retaining component 320-2 keeps the luminaire anchor 335-1 in a fixed and stable position when the retention device anchor 328-1 and the luminaire anchor 335-1 are coupled to each other. In addition, the retention device retaining feature 329-1 of the anchoring and retaining component 320-2 retains the luminaire retention feature 333-1 of the retention device 330-1 once the luminaire retention feature 333-1 is forced downward enough to engage the retention device retaining feature 329-1.

The resilient feature 334-1 can have any of a number of configurations and/or be made of any of a number of materials. For example, as in this case, the resilient feature 334-1 can be or include a metal tension spring. As another example, the resilient feature 334-1 can be or include a plastic tension spring. As yet another example, the resilient feature 334-1 can be or include a rubber or silicone band. As still another example, the resilient feature 334-1 can be or include a torsion spring with a retractable reel (e.g., with rotatable wheels, with ratchets, with a release mechanism). As yet another example, the resilient feature 334-1 can be or include a counterweight. As still another example, the resilient feature 334-1 can be or include a constant force spring (e.g., a coiled metal band). In some cases, as when the resilient feature 334-1 is in the form of a retractable reel, certain components (e.g., the luminaire retention feature 333-1) of the retention device 330-1 and/or certain components (e.g., the retention device retaining feature 329-1) of the anchoring and retaining component 320-2 can be omitted from the trim retention assembly 280.

In certain example embodiments, the luminaire retention feature 333-1 of the retention device 330-1 is configured to be retained for some limited period of time (e.g., a few minutes, an hour) by the retention device retaining feature 329-1 of the anchoring and retaining component 320-2 to keep the resilient feature 334-1 (and so also the retention device 330-1 and the trim retention assembly 280) in the loaded position. The luminaire retention feature 333-1 is also configured to be released from the retention device retaining feature 329-1 to the unloaded position when the user performs a certain action (e.g., pull down on the trim assembly 150 and rotate the trim assembly 150 counter-clockwise by approximately 15°, push up on the trim assembly 150, pull down on the trim assembly 150 and release the trim assembly 150, rotate the trim assembly 150 clockwise) that directly or indirectly affects the movement and position of the luminaire retention feature 333-1 of the retention device 330-1. The luminaire retention feature 333-1 can be configured to repeat this cycle multiple times.

To accomplish this function, the luminaire retention feature 333-1 can include one or more features, including one or more coupling features. In this example, as shown in FIG. 5, the luminaire retention feature 333-1 is in the form of a bump or shelf at the bottom of the resilient feature 334-1 and at the top of the extension 332-1. The characteristics (e.g., shape, size) of the luminaire retention feature 333-1 are configured to couple to (in this case, be received and secured by) part of (in this case, the coupling feature 322-1 and the receiving feature 323-1) the retention device retaining feature 329-1 of the anchoring and retaining component 320-2.

The extension 332-1 of the retention device 330-1 is configured to provide a link between the resilient feature 334-1/luminaire retention feature 333-1 and the trim coupling feature 331-1. The extension 332-1 can be rigid, malleable, and/or flexible. The length of the extension 332-1 can be any length suitable to maintain the proper distance between the resilient feature 334-1/luminaire retention feature 333-1 and the trim coupling feature 331-1 to allow for sufficient access to the trim coupling feature 331-1 in the volume of space 138 when the retention device 330-1 is in the loaded position and to maintain a proper seal between the top of the trim flange 151 and the bottom of the structure 159 when the retention device 330-1 is in the unloaded position.

The trim coupling feature 331-1 of the retention device 330-1 is configured to couple to the trim assembly 150. More specifically, the trim coupling feature 331-1 of the retention device 330-1 is configured to couple to a retention device coupling feature 755 (discussed below with respect to FIGS. 6 and 7) of the trim assembly 150. To accomplish this function, the trim coupling feature 331-1 can include one or more features, including one or more coupling features. In this example, as shown in FIG. 5, the trim coupling feature 331-1 is in the form of a hook. The characteristics (e.g., shape, size) of the trim coupling feature 331-1 are configured to complement and couple to a retention device coupling feature 755 of the trim assembly 150.

Figure 6:
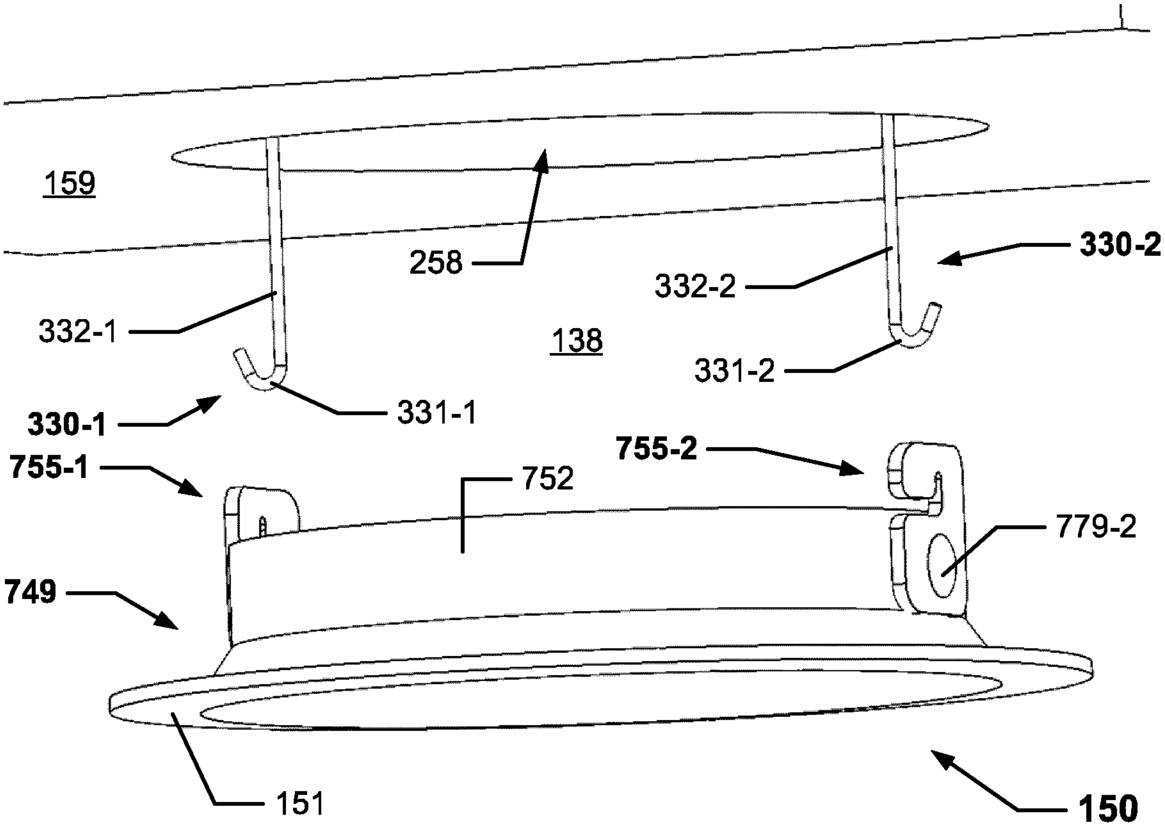
FIG. 6 shows a detailed view of another subassembly of the trim retention assembly of FIG. 2 according to certain example embodiments.
Figure 7:
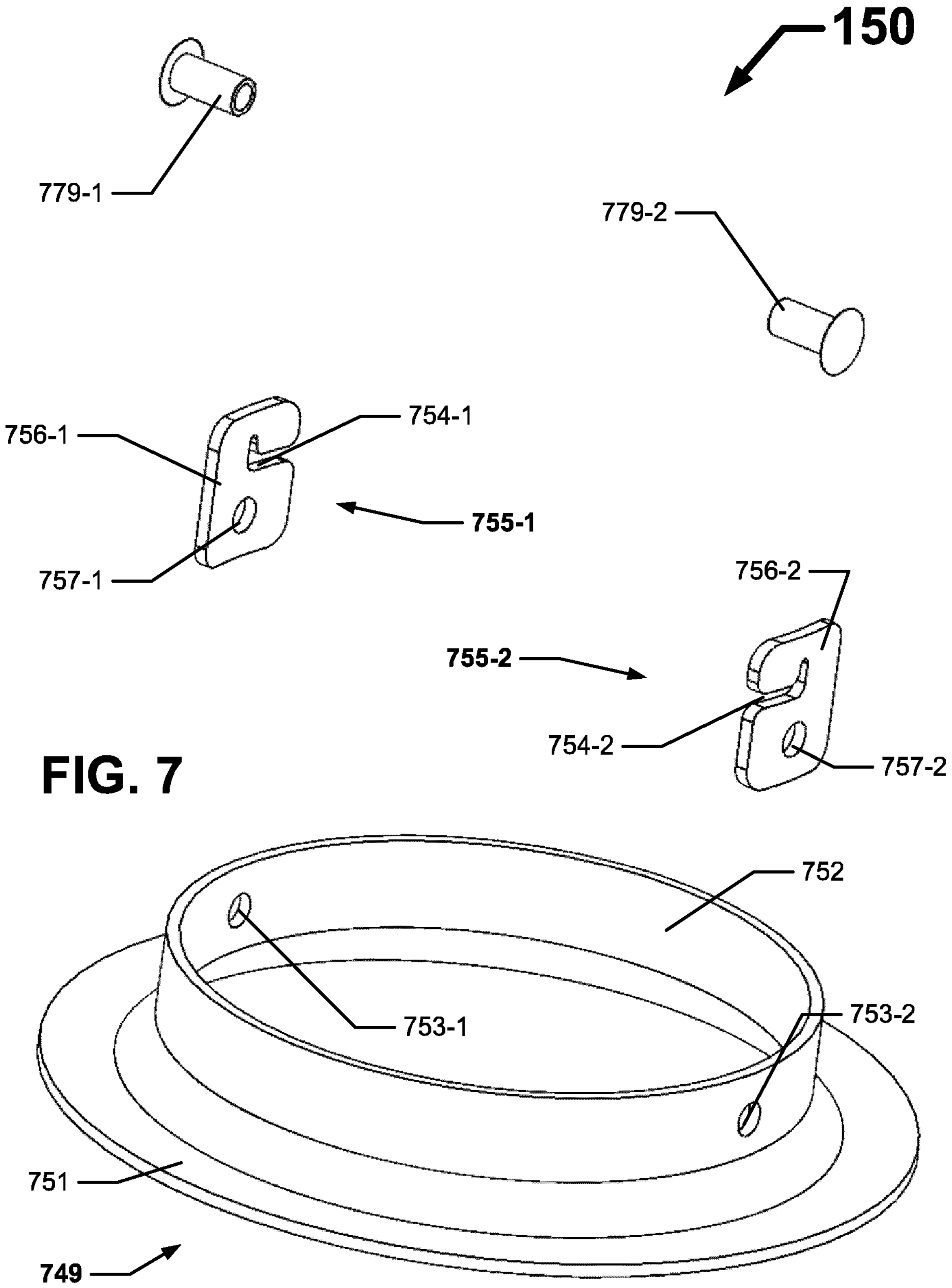
FIG. 7 shows an exploded view of the trim assembly of FIG. 2 according to certain example embodiments.

FIG. 6 shows a detailed view of another subassembly of the trim retention assembly of FIG. 2 according to certain example embodiments. FIG. 7 shows an exploded view of the trim assembly 150 of FIG. 2 according to certain example embodiments. Referring to FIGS. 1A through 7, the subassembly of FIG. 6 shows the retention device 330-1 and the retention device 330-2 in the loaded position. As a result, the trim coupling feature 331-1 of the retention device 330-1 is disposed in the volume of space 138, and the extension 332-1 of the retention device 330-1 traverses the aperture 258 in the structure 159. Similarly, the trim coupling feature 331-2 of the retention device 330-2 is disposed in the volume of space 138, and the extension 332-2 of the retention device 330-2 traverses the aperture 258 in the structure 159.

Since the coupling features 331 of both retention devices 330 are accessible to a user in the volume of space 138, a user can couple the coupling feature 331-1 and the retention device coupling feature 755-1 of the trim assembly 150 to each other, and the user can also couple the coupling feature 331-2 and the retention device coupling feature 755-2 of the trim assembly 150 to each other.

In certain example embodiments, the trim assembly 150 includes multiple components. For example, in this case, the trim assembly 150 includes a trim 749 and one or more (in this case, two) retention device coupling feature 755. The trim 749 of the trim assembly 150 can have any of a number of features and/or components. For example, in this case, the trim 749 has a trim flange 151 that extends outward from the bottom of a trim collar 152. The trim collar 152 can include one or more coupling features 753 (in this case, in the form of apertures that traverse the thickness of the trim collar 152) that are configured to couple, directly or indirectly, to the one or more retention device coupling features 755.

The number of coupling features 753 can be the same as or different (e.g., greater) than the number of retention device coupling features 755. When there are multiple coupling features 753, one coupling feature 753 can be configured the same or differently than one or more of the other coupling features 753. Also, when there are multiple coupling features 753, the coupling features 753 can be distributed in any of a number of ways (e.g., equidistantly (as in this example), randomly) around the trim collar 152.

Each retention device coupling feature 755 is configured to couple to both the trim collar 152 (or other portion of the trim 749) and the coupling feature 331 of a retention device 330. In order to accomplish these functions, each retention device coupling feature 755 can include multiple coupling features. For instance, in this case, retention device coupling feature 755-1 includes a body 756-1 that has coupling feature 754-1 and coupling feature 757-1 disposed thereon. Similarly, retention device coupling feature 755-2 includes a body 756-2 that has coupling feature 754-2 and coupling feature 757-2 disposed thereon. When there are multiple retention device coupling features 755-2, they can be configured substantially identically to each other, as in this example. Alternatively, one or more characteristics (e.g., shape and size of the body, configuration of coupling feature 754 and/or coupling feature 757) of one retention device coupling feature 755 can differ from a corresponding characteristic of one or more of the other retention device coupling features 755.

In this case, the coupling feature 757 of each retention device coupling feature 755 is an aperture that traverses the thickness of the body 756. The characteristics (e.g., shape, size, location on the body 756) of the coupling feature 757 are designed to complement the characteristics of the coupling feature 753 on the trim collar 752 to which the coupling feature 757 directly or indirectly couples. In this case, since each coupling feature 757 and each coupling feature 753 are apertures, independent coupling feature 779 (in this case, in the form of a rivet) are disposed within the corresponding coupling feature 757 and coupling feature 753 to couple a retention device coupling feature 755 and the trim 749 to each other. Specifically, in this example, coupling feature 779-1 is coupled to coupling feature 757-1 and coupling feature 753-1, and coupling feature 779-2 is coupled to coupling feature 757-2 and coupling feature 753-2.

Each coupling features 754 of a retention device coupling feature 755 is configured to complement and couple to the coupling feature 331 of a retention device 330. In this case, each coupling feature 754 is in the form of a L-shaped slot that traverses the thickness of the body 756 of the respective retention device coupling feature 755. Specifically, coupling feature 754-1, which his configured to couple to coupling feature 331-1 of retention device 330-1, is a L-shaped slot that traverses the thickness of the body 756-1 of the retention device coupling feature 755-1, and coupling feature 754-2, which his configured to couple to coupling feature 331-2 of retention device 330-2, is a L-shaped slot that traverses the thickness of the body 756-2 of the retention device coupling feature 755-2.

In this example, the coupling feature 331-1 of retention device 330-1 slides along the long straight portion of the coupling feature 754-1 and then upward. Similarly, the coupling feature 331-2 of retention device 330-2 slides along the long straight portion of the coupling feature 754-2 and then upward. In some cases, rather than being a separate component, one or more of the retention device coupling features 755 can be integrated with part (e.g., the trim collar 152) of the trim 749.

Figure 8:
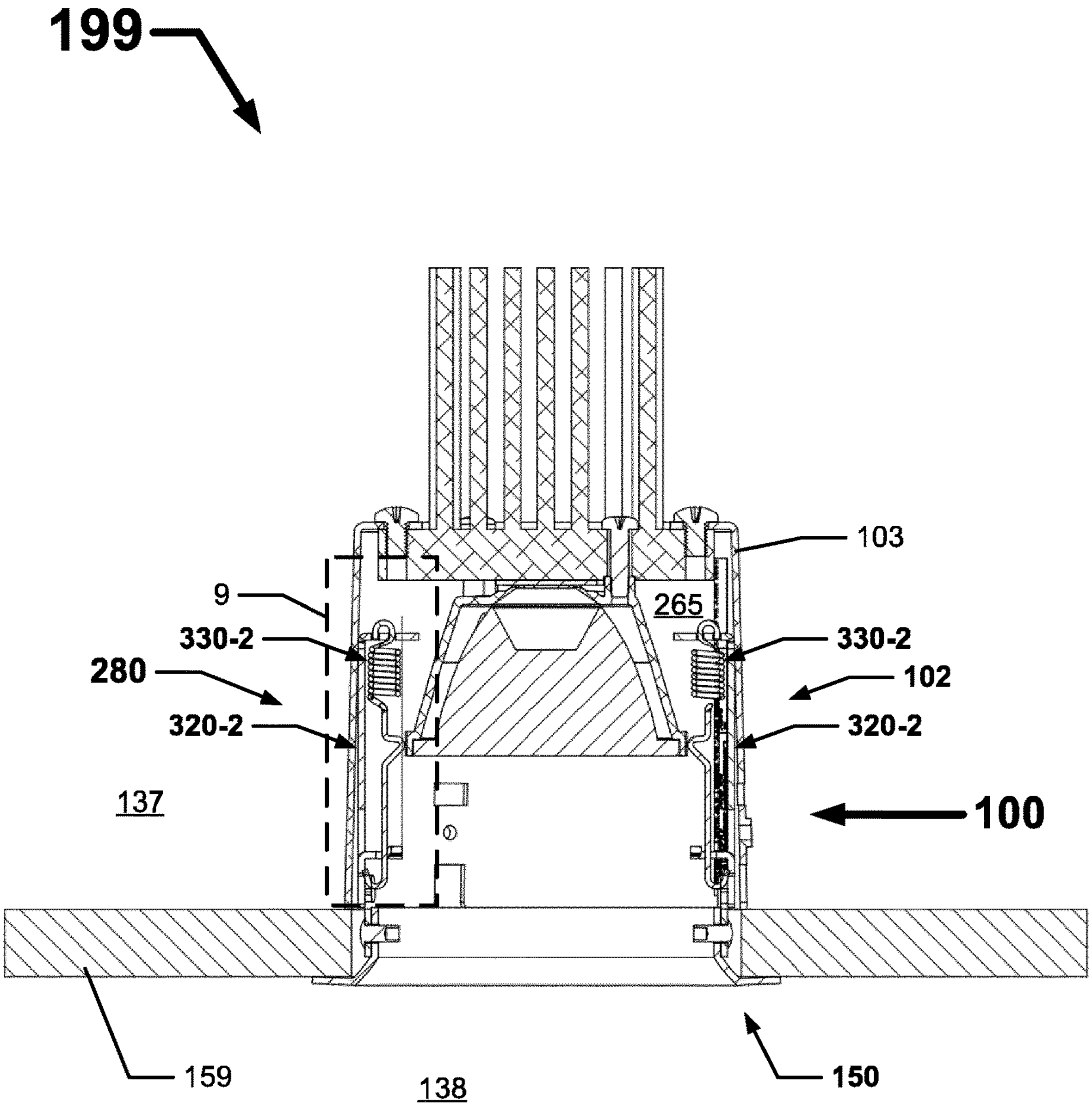
FIG. 8 shows a cross-sectional side view of the system of FIGS. 1A and 1B with the trim retention assembly of the recessed luminaire in the unloaded position according to certain example embodiments.

When the retention device coupling features 755 of the trim assembly 150 are coupled to the coupling features 331 of the retention devices 330 of the trim retention assembly 280, the retention devices 330 can be returned to the unloaded position. As discussed above, the retention devices 330 can be returned to the unloaded position from the loaded position when the user performs some action (e.g., pull down slightly on the trim assembly 150 and rotate the trim assembly 150 counter-clockwise by approximately 15°, push up on the trim assembly 150, pull down on the trim assembly 150 and release the trim assembly 150, rotate the trim assembly 150 clockwise) to release the luminaire retention features 333 from the retention device retaining features 329. FIG. 8 shows a cross-sectional side view of the system of FIGS. 1A and 1B with the trim retention assembly 280 of the recessed luminaire 100 in the unloaded position according to certain example embodiments. FIG. 9 shows part of the trim retention assembly 280 of FIG. 8 according to certain example embodiments.

Referring to FIGS. 1A through 9, when retention device 330-1 and retention device 330-2 are both in the unloaded position, all of retention device 330-1 and all of retention device 330-2 are disposed within the cavity 265 formed by the housing wall 103 of the housing 102 (as opposed to in the aperture 258 in the structure 159 or in the volume of space 138). The anchoring and retaining component 320-1 and the anchoring and retaining component 320-2 remain stationary between the retention device 330-1 and retention device 330-2 being in the loaded position and the unloaded position.

When the retention devices 330 are in the unloaded position, the resilient feature 334 (such as resilient feature 334-1 shown in FIG. 9) becomes compressed, which elevates the luminaire retention feature 333 (such as luminaire retention feature 333-1 in FIG. 9), the extension 332 (such as extension 332-1 in FIG. 9), and coupling feature 331 (such as coupling feature 331-1 in FIG. 9) relative to the vertical position of those components of the retention devices 330 when the retention devices 330 are in the loaded position. The configuration (e.g., shape, size) of the luminaire anchor 335, the luminaire retention feature 333, the extension 332, and the coupling feature 331 do not substantially change between when the retention device 330 is in the loaded position and the unloaded position.

As shown in FIGS. 2 and 8, the various components (e.g., the anchoring and retaining components 320, the retention devices 330), including components and features thereof, of the trim retention assembly 280 avoid direct contact with any other components (e.g., reflector, housing walls 103) of the recessed luminaire 100 that are positioned within the cavity 265. In this way, the trim assembly 150 can be retracted from and put into place with respect to the rest of the recessed luminaire 100 without interference with any of those other components of the recessed luminaire 100 inside the cavity 265.

Figure 10:
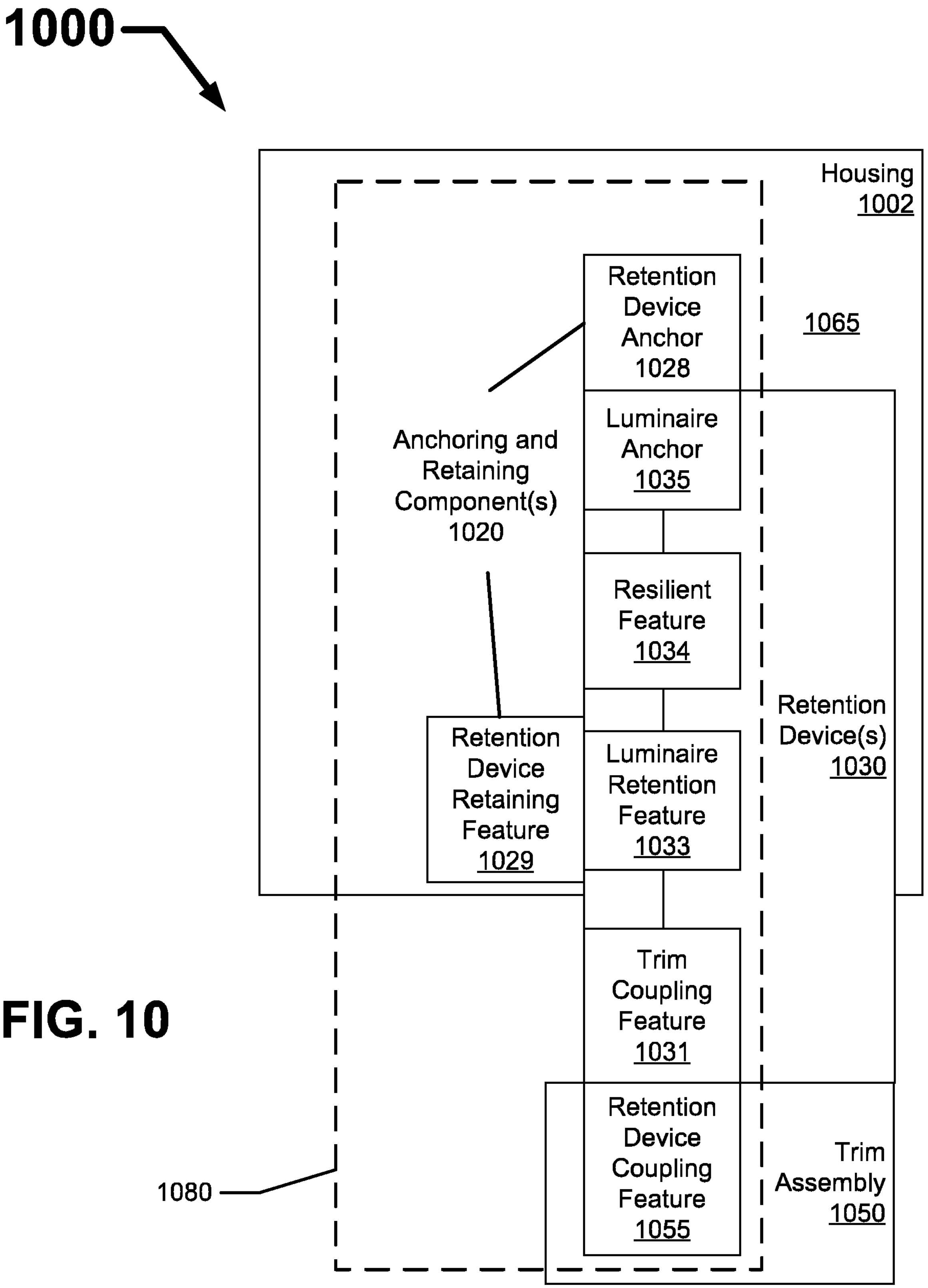
FIG. 10 shows a block diagram of a luminaire with a trim retention assembly in the loaded position according to certain example embodiments.
Figure 11:
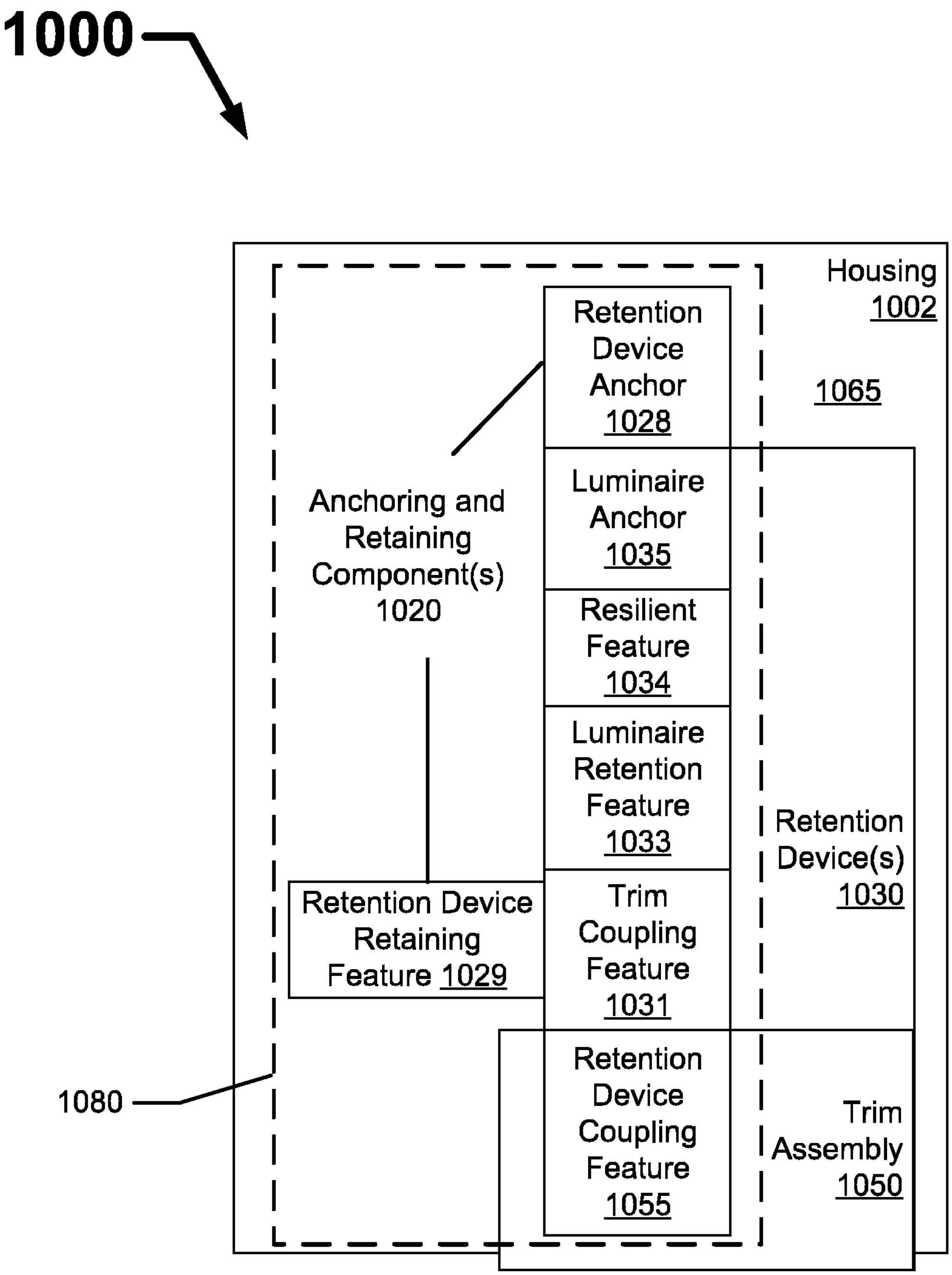
FIG. 11 shows a block diagram of the luminaire of FIG. 10 with the trim retention assembly in the unloaded position according to certain example embodiments.

FIG. 10 shows a block diagram of a recessed luminaire 1000 that includes a trim retention assembly 1080 in the loaded position according to certain example embodiments. FIG. 11 shows a block diagram of the luminaire 1000 of FIG. 10 with the trim retention assembly 1080 in the unloaded position according to certain example embodiments. Each of the components (e.g., the retention device anchor 1028, the retention device 1030) shown in FIGS. 10 and 11 can include a single component or multiples of that component. Referring to FIGS. 1A through 11, the recessed luminaire 1000 in the block diagram of FIGS. 10 and 11 includes a housing 1002, a trim assembly 1050, an anchoring and retaining component 1020, and a retention device 1030. The components of the recessed luminaire 1000 of FIGS. 10 and 11 are substantially the same as the corresponding components of the recessed luminaire 100 discussed above with respect to FIGS. 1A through 9.

The trim assembly 1050 includes a retention device coupling feature 1055. The trim retention assembly 1080 includes the anchoring and retaining component 1020 and the retention device 1030. The anchoring and retaining component 1020 includes a retention device anchor 1028 and a retention device retaining feature 1029, and the retention device 1030 includes a luminaire anchor 1035, a resilient feature 1034, a luminaire retention feature 1033, and a coupling feature 1031. As discussed above, any of these components of the trim retention assembly 1080 can be combined with one or more other components, omitted, integrated with another part (e.g., the inner surface of the housing wall of the housing 1002) of the luminaire 1000, or otherwise altered from what is shown in FIGS. 10 and 11.

The retention device anchor 1028 of the anchoring and retaining component 1020 is coupled to the luminaire anchor 1035 of the retention device 1030. When the trim retention assembly 1080 is in the loaded position, as in FIG. 10, the luminaire retention feature 1033 of the retention device 1030 is engaged with the retention device retaining feature 1029 to extend the resilient feature into the loaded position. As a result, the trim coupling feature 1031 of the retention device 1030 falls outside the cavity 1065 of the housing 1002 and is accessible so that a user can couple the trim coupling feature 1031 to the retention device coupling feature 1055 of the trim assembly 1050.

When the trim retention assembly 1080 is in the unloaded position, as in FIG. 11, the luminaire retention feature 1033 of the retention device 1030 is disengaged from the retention device retaining feature 1029, which allows the resilient feature to contract into its default position, which is the loaded position. As a result, the trim coupling feature 1031 of the retention device 1030 and the retention device coupling feature 1055 of the trim assembly 1050 are raised into the cavity 1065 of the housing 1002, and so become inaccessible to a user.

Figure 12:
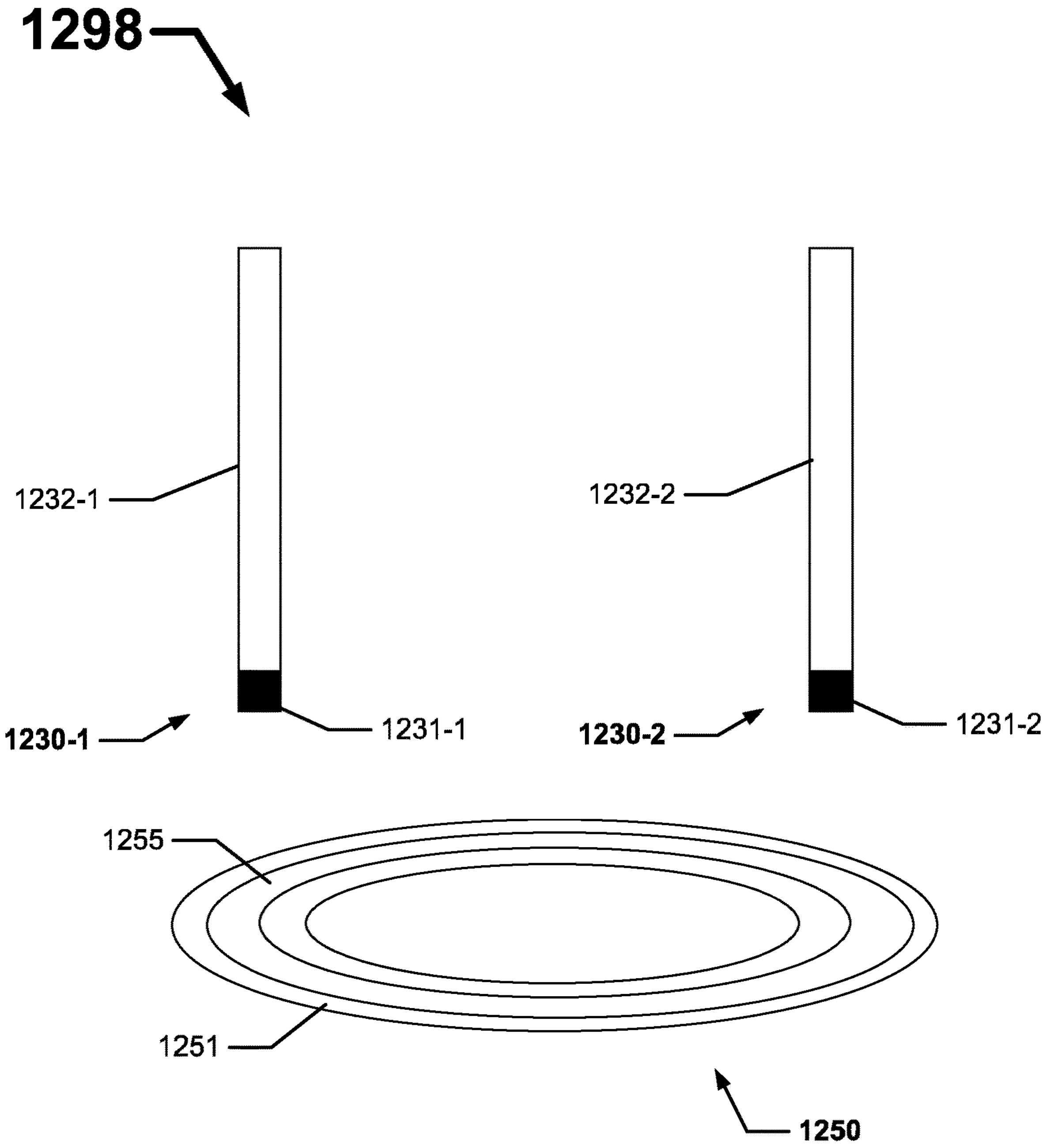
FIG. 12 shows a subassembly of a portion of another trim retention assembly according to certain example embodiments.

FIG. 12 shows a subassembly 1298 of a portion of another trim retention assembly according to certain example embodiments. Referring to FIGS. 1A through 12, the subassembly 1298 of FIG. 12 includes an extension 1232-1 and a coupling feature 1231-1 of a retention device 1230-1 and an extension 1232-2 and a coupling feature 1231-2 of a retention device 1230-2, where the retention device 1230-1 and the retention device 1230-2 are part of an example trim retention assembly. In this case, the coupling features 1231 are in the form of magnets.

The trim assembly 1250 in this case does not include a trim collar (e.g., trim collar 752). Rather, the trim assembly 1250 includes a trim flange 1251 with a retention device coupling feature 1255 disposed on the top surface of the trim flange 1251. The retention device coupling feature 1255 in this example in this case is in the form of a steel plate that has a magnetic polarity that is opposite the polarity of the magnets of the coupling features 1231 of the retention devices 1230. In this way, when the coupling features 1231 contact the retention device coupling feature 1255, the retention devices 1230 and the trim assembly 1250 become magnetically coupled to each other.

Figure 13:
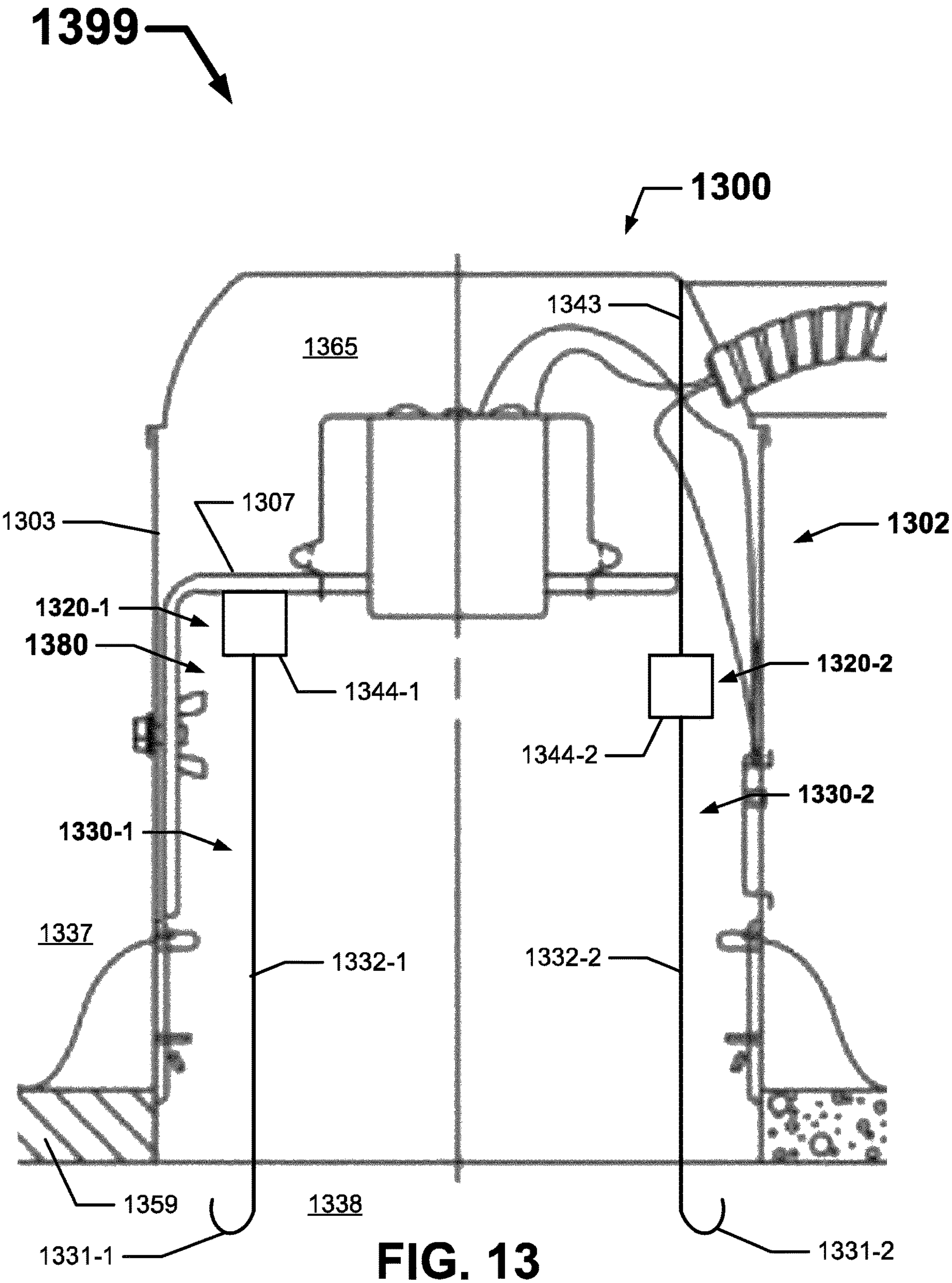
FIG. 13 shows a system that includes a different recessed luminaire according to certain example embodiments.

FIG. 13 shows a system 1399 that includes a different recessed luminaire 1300 according to certain example embodiments. Referring to FIGS. 1A through 13, the system 1399 of FIG. 13 shows the recessed luminaire 1300 mounted in a structure 1359 (e.g., a ceiling). The trim assembly (e.g., trim assembly 150) in this case is omitted. The housing 1302 in this case is in the form of a can that has one or more housing walls 1303 that form a cavity 1365. The trim retention assembly 1380 is shown in FIG. 13 in the loaded position, and so the coupling feature 1331-1 and part of the extension 1332-1 of the retention device 1330-1, as well as the coupling feature 1331-2 and part of the extension 1332-2 of the retention device 1330-2, are disposed in the volume of space 1338 below the structure 1359, and so are accessible to a user. The rest (e.g., the housing 1302, the remainder of the trim retention assembly 1380) of the recessed luminaire 1300 is disposed in the volume of space 1337 located in the same plane as and/or above the structure 1359.

The trim retention assembly 1380 includes two retention devices 1330 (retention device 1330-1 and retention device 1330-2) and two anchoring and retaining components 1320 (anchoring and retaining component 1320-1 and anchoring and retaining component 1320-2). The anchoring and retaining component 1320-1 and the retention device 1330-1 of the trim retention assembly 1380 engage with each other on one side of the cavity 1365 within the housing 1302, and the anchoring and retaining component 1320-2 and the retention device 1330-2 of the trim retention assembly 1380 engage with each other on the opposite side of the cavity 1365 within the housing 1302.

In this case, each of the anchoring and retaining components 1320 and part of each of the retention devices 1330 include a retractable reel with a tape (e.g., a flexible metal strip) contained in an enclosure 1344. Enclosure 1344-1 is mounted directly to a bracket 1307 in the cavity 1365 of the housing 1302. Enclosure 1344-2 is coupled to the bottom end of a strap 1343, where the top end of the strap 1343 is coupled to the top of the housing 1302 within the cavity 1365. Inside of each enclosure 1344 can be the equivalent (referring to FIGS. 10 and 11) of the luminaire retention feature 1033 of the retention device 1030, the resilient feature 1034 of the retention device 1030, and the retention device retaining features 1029 of the anchoring and retaining component 1020.

The top of each enclosure 1344 can include a coupling feature (e.g., a clip, an aperture) that serves as an equivalent of the luminaire anchor 1035. The bracket 1307 can include a coupling feature that serves as an equivalent of the retention device anchor 1028 to couple to the coupling feature of the enclosure 1344-1. The top of the housing 1302 within the cavity 1365 can have a coupling feature that serves as an equivalent of the retention device anchor 1028 to indirectly couple to the coupling feature of the enclosure 1344-2. The strap 1343 can serve as part of the equivalent of the retention device anchor 1028 or the luminaire anchor 1035 for the enclosure 1344-2.

Figure 14A:
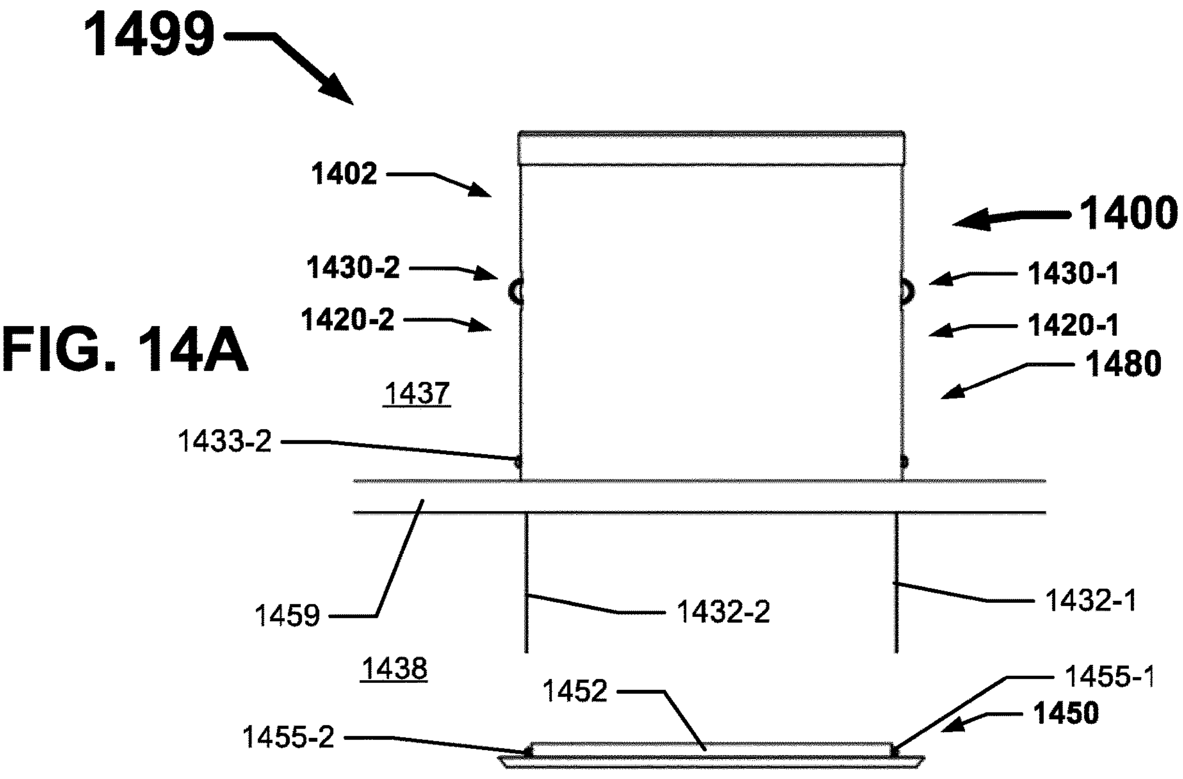
Figure 14B:
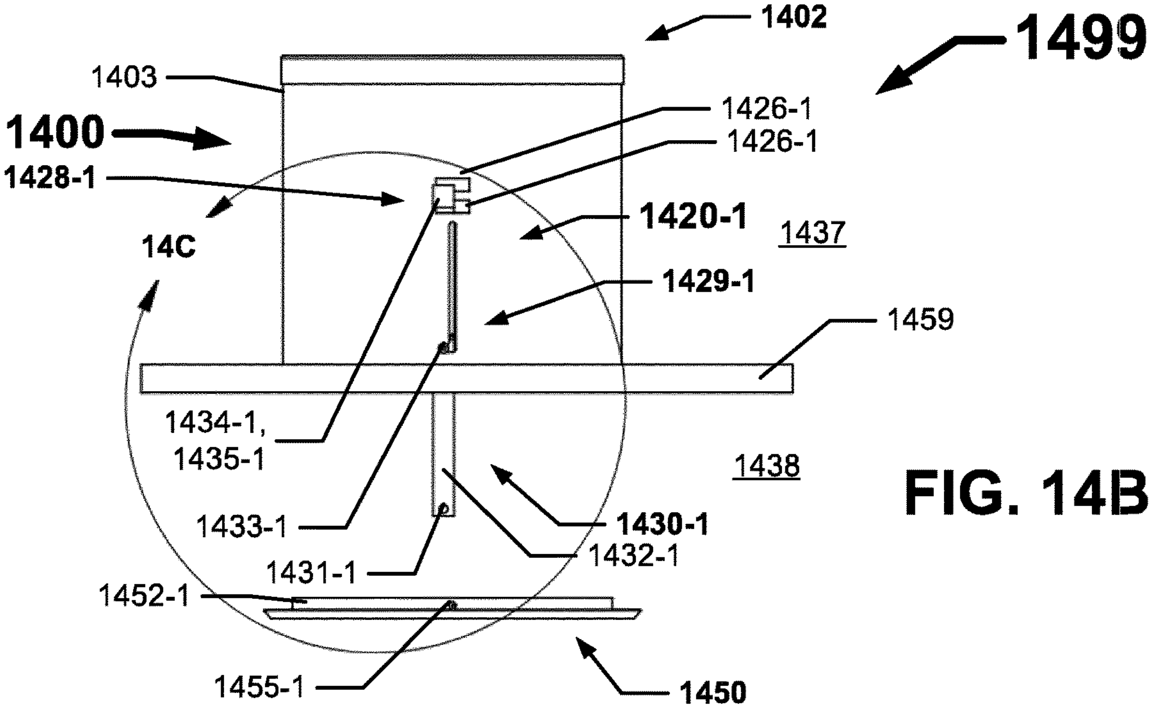

FIGS. 14A through 14C show various views of a system 1499 that includes another trim retention assembly 1480 in the loaded position according to certain example embodiments. Specifically, FIG. 14A shows a front view of the system 1499 with the trim retention assembly 1480 in the loaded position. FIG. 14B shows a side view of the system 1499 with the trim retention assembly 1480 in the loaded position. FIG. 14C shows a detailed side view of the system 1499 with the trim retention assembly 1480 in the loaded position.

Figure 15B:
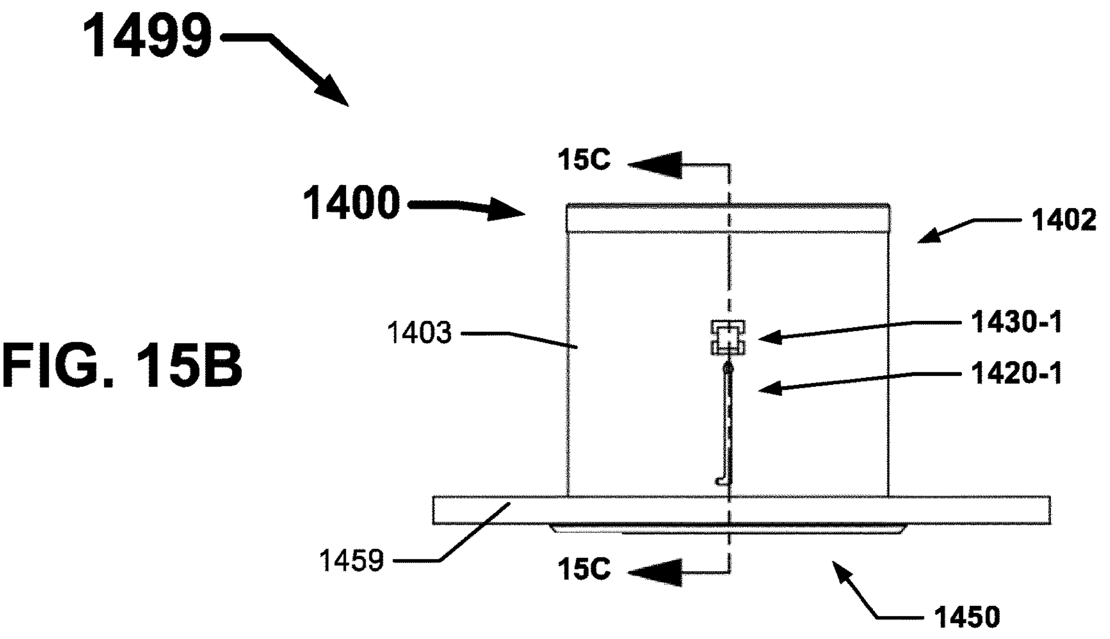
Figure 15C:
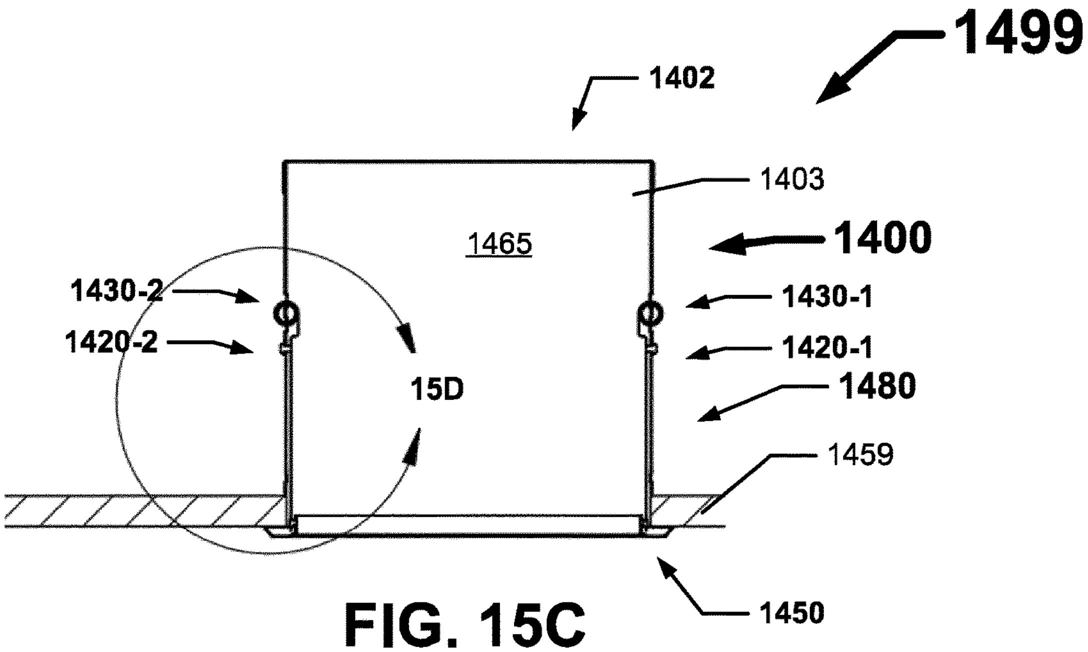
Figure 15D:
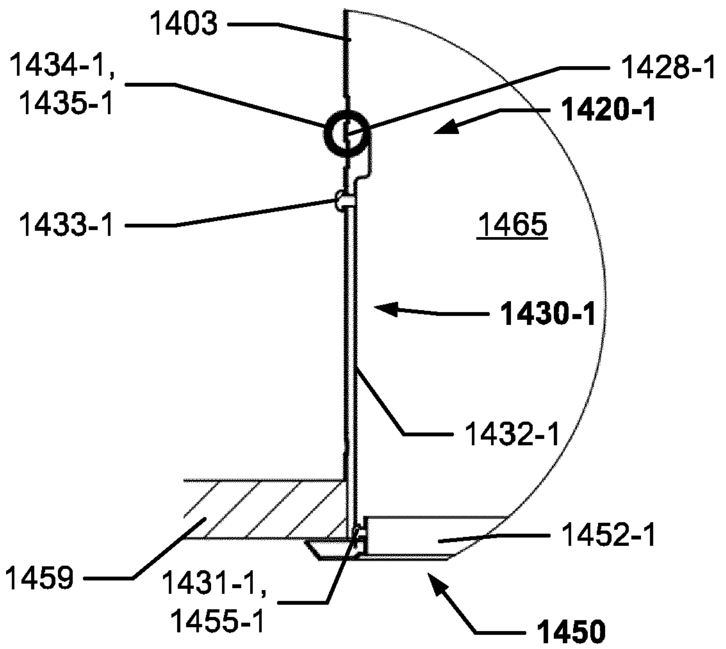
Figure 15E:
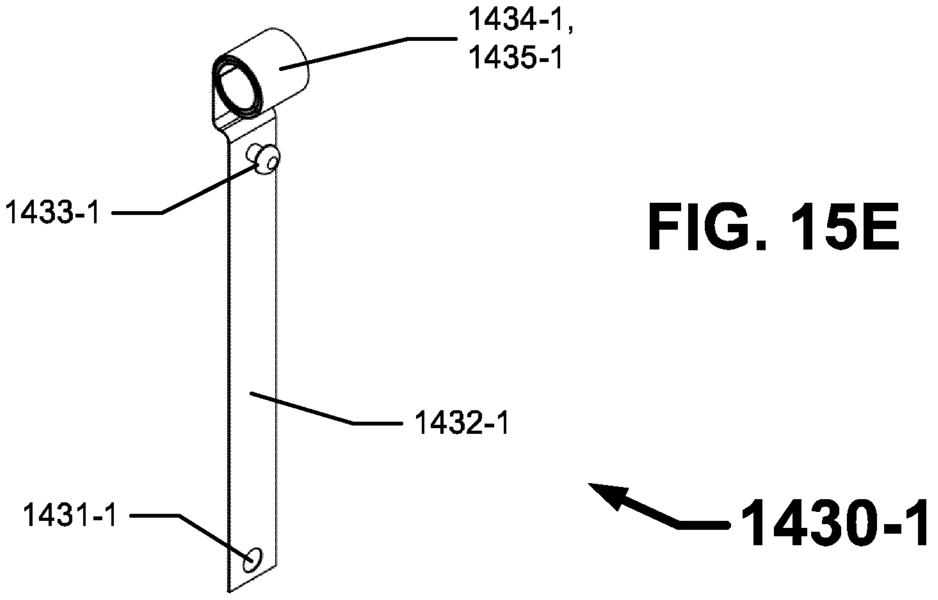

Also, FIGS. 15A through 15E show various views of the system 1499 of FIGS. 14A through 14C with the trim retention assembly 1480 in the unloaded position according to certain example embodiments. Specifically, FIG. 15A shows a top perspective view of the system 1499 with the trim retention assembly 1480 in the unloaded position. FIG. 15B shows a side view of the system 1499 with the trim retention assembly 1480 in the unloaded position. FIG. 15C shows a cross-sectional front view of the system 1499 with the trim retention assembly 1480 in the unloaded position. FIG. 15D shows a detailed cross-sectional front view of the system 1499 with the trim retention assembly 1480 in the unloaded position. FIG. 15E shows a perspective view of a retention device 1430-1 of the trim retention assembly 1480 of FIGS. 14A through 15D in the unloaded position.

Referring to FIGS. 1A through 15E, the system 1499 of FIGS. 14A through 15E show a recessed luminaire 1400 mounted in a structure 1459 (e.g., a ceiling). The trim assembly 1450 in FIGS. 14A through 14C, when the trim retention assembly 1480 is in the loaded position, is uncoupled from the trim retention assembly 1480. The trim assembly 1450 is coupled to the trim retention assembly 1480 when the trim retention assembly 1480 is in the unloaded position, as shown in FIGS. 15A through 15E, and in such a case the trim assembly 1450 is pulled securely against the structure 1459 by the trim retention assembly 1480.

The housing 1402 in this case is in the form of a can or cylinder that has one or more housing walls 1403 that form a cavity 1465. When the trim retention assembly 1480 is in the loaded position, the coupling feature 1431-1 and part of the extension 1432-1 of the retention device 1430-1, as well as the coupling feature and part of the extension 1432-2 of the retention device 1430-2, are disposed in the volume of space 1438 below the structure 1459, and so are accessible to a user and the trim assembly 1450. The rest (e.g., the housing 1402, the remainder of the trim retention assembly 1480) of the recessed luminaire 1400 is disposed in the volume of space 1437 located in the same plane as and/or above the structure 1459.

The trim retention assembly 1480 includes two retention devices 1430 (retention device 1430-1 and retention device 1430-2) and two anchoring and retaining components 1420 (anchoring and retaining component 1420-1 and anchoring and retaining component 1420-2). The anchoring and retaining component 1420-1 and the retention device 1430-1 of the trim retention assembly 1480 engage with each other on one side of the housing 1402, and the anchoring and retaining component 1420-2 and the retention device 1430-2 of the trim retention assembly 1480 engage with each other on the opposite side of the housing 1402.

In this case, each of the anchoring and retaining components 1420 are multiple slots integrated with the housing wall 1403 of the housing 1402. Specifically, anchoring and retaining component 1420-1 includes a retention device anchor 1428-1 in the form of two horizontal slots 1426-1 and a retention device retaining feature 1429-1 in the form of a L-shaped slot with an elongated vertical portion 1423-1 and a horizontal extension 1422-1 at the distal end of the elongated vertical portion 1423-1. The anchoring and retaining component 1420-2 of the trim retention assembly 1480 can be similarly arranged, with a retention device anchor in the form of two horizontal slots and a retention device retaining feature in the form of a L-shaped slot with an elongated vertical portion and a horizontal extension at the distal end of the elongated vertical portion.

Also in this case, each of the retention devices 1430 includes a coil spring (or some other form of substantially constant force spring). Specifically, the retention device 1430-1 includes the coil spring, which serves as the luminaire anchor 1435-1 and the resilient feature 1434-1, an extension 1432-1 in the form of a substantially planar strip that extends downward from the distal end of the coil spring, a luminaire retention feature 1433-1 in the form of a protrusion in the outer surface of the extension 1432-1 toward the proximal end of the extension 1432-1, and a trim coupling feature 1431-1 in the form of an aperture that traverses the extension 1432-1 toward the distal end of the extension 1432-1. The retention device 1430-1 can be similarly arranged, with a coil spring serving as the luminaire anchor and the resilient feature, an extension 1432-1 in the form of a substantially planar strip that extends downward from the distal end of the coil spring, a luminaire retention feature 1433-1 in the form of a protrusion in the outer surface of the extension 1432-1 toward the proximal end of the extension 1432-1, and a trim coupling feature in the form of an aperture that traverses the extension 1432-1 toward the distal end of the extension.

Since the retention device 1430-1 and the retention device 1430-2 are configured substantially the same as each other, and since the anchoring and retaining component 1420-1 and the anchoring and retaining component 1420-2 are configured substantially the same as each other, the description of the interaction between the retention device 1430-1 and the anchoring and retaining component 1420-1 applies equally to the interaction between the retention device 1430-2 and the anchoring and retaining component 1420-2. The coil spring of the retention device 1430-1 is wrapped multiple times through the slots 1426-1 of the retention device anchor 1428-1 of the anchoring and retaining component 1420-1, allowing the coil spring to unwind, while part of the coil spring remains wrapped through the slots 1426-1, when a sufficient downward force is applied to the extension 1432-1 of the retention device 1430-1. When the downward force is applied to the extension 1432-1 of the retention device 1430-1 is removed or no longer sufficiently strong, the coil spring retracts to its default position.

The luminaire retention feature 1433-1 of the retention device 1430-1 is disposed in the L-shaped slot of the anchoring and retaining component 1420-1. The length of the elongated vertical portion 1423-1 of the slot of the anchoring and retaining component 1420-1 sets the limits of travel of the extension 1432-1 of the retention device 1430-1. To put the retention device 1430-1 in the loaded position, as shown in FIGS. 14A through 14C, when the luminaire retention feature 1433-1 reaches the distal end of the elongated vertical portion 1423-1 of the slot, the luminaire retention feature 1433-1 can move laterally (e.g., caused when a user pushes the distal end of the extension 1432-1 laterally) along the horizontal extension 1422-1 of the slot, which keeps the retention device 1430-1 in the loaded position.

When the luminaire retention feature 1433-1 is not in the horizontal extension 1422-1 of the slot, in the absence of a downward or retaining force to move or keep the luminaire retention feature 1433-1 toward the distal end of the elongated vertical portion 1423-1 of the slot, the luminaire retention feature 1433-1 is drawn to the proximal end of the elongated vertical portion 1423-1 of the slot by the coil spring returning to its default position, as shown in FIGS. 15A through 15E. The extension 1432-1 is disposed within the cavity 1465 of the housing 1402, while at least the distal end of the luminaire retention feature 1433-1 is outside the housing 1402.

The trim coupling feature 1431-1 of the retention device 1430-1 is configured to couple, directly or indirectly, to the retention device coupling feature 1455-1 of the trim assembly 1450. Similarly, the trim coupling feature of the retention device 1430-2 is configured to couple, directly or indirectly, to the retention device coupling feature 1455-2 of the trim assembly 1450. In this case, the retention device coupling feature 1455-1 and the retention device coupling feature 1455-2 of the trim assembly 1450 are protrusions that extend outward from the flange 1452 of the trim assembly 1450. The protrusions of the retention device coupling features 1455 are configured to be disposed within the apertures of the trim coupling features 1431, regardless of whether the retention devices 1430 are in the loaded position or the unloaded position.

Figure 16A:
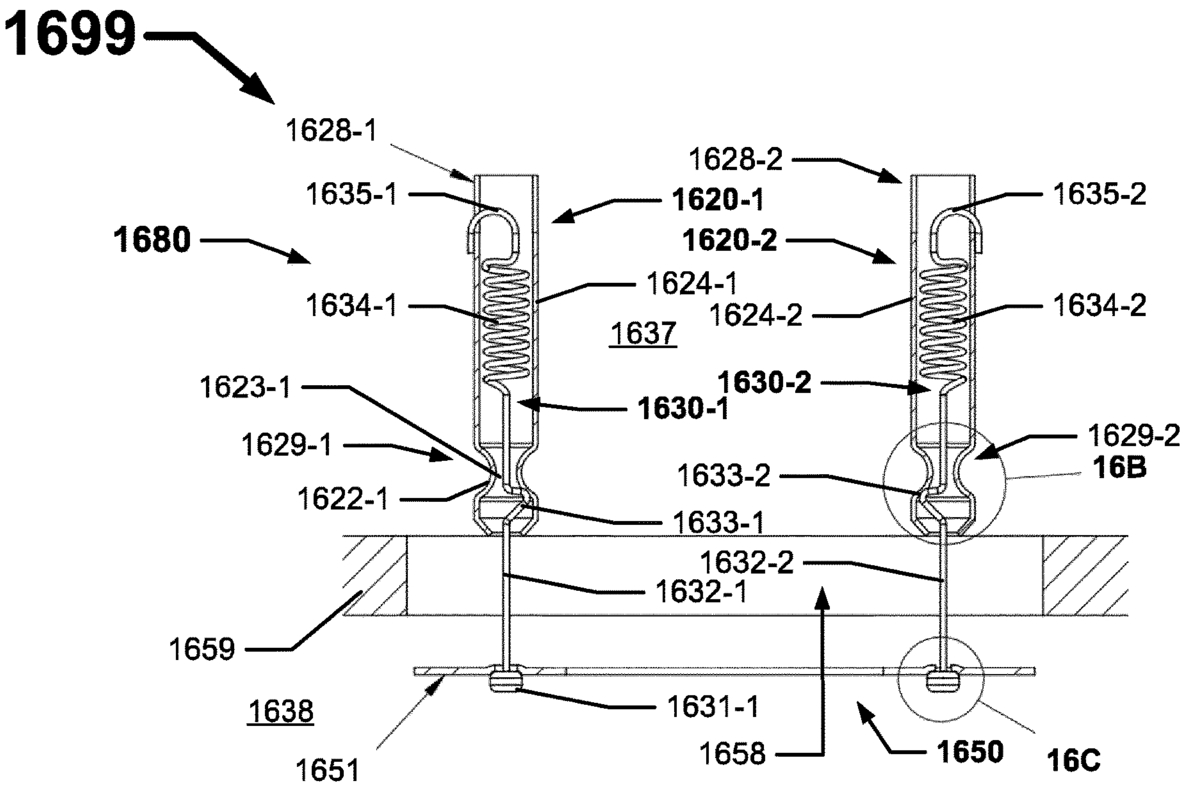
FIGS. 16A through 16G show various views of a system that includes yet another trim retention assembly in the loaded position according to certain example embodiments.
Figure 16B:
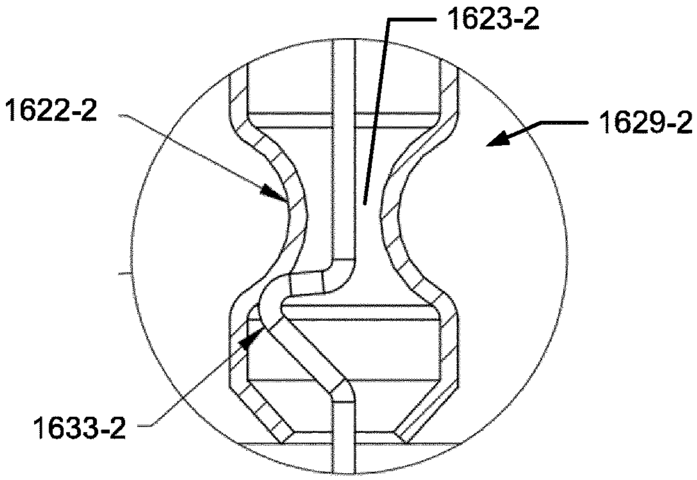
Figure 16C:
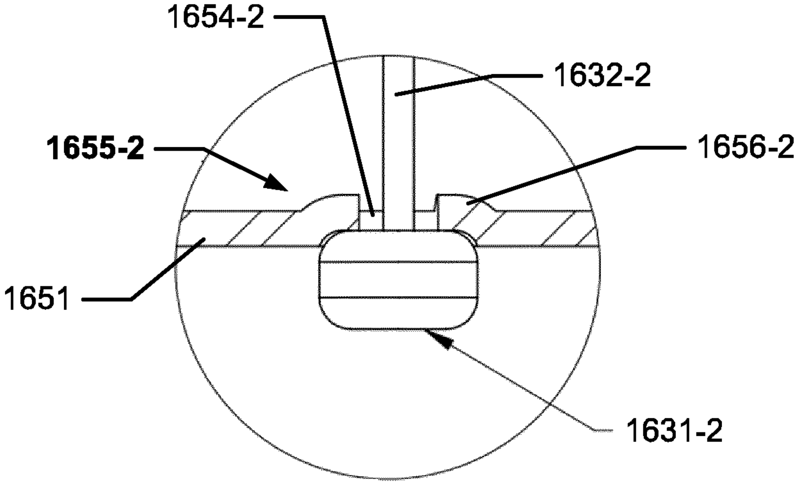
Figure 16D:
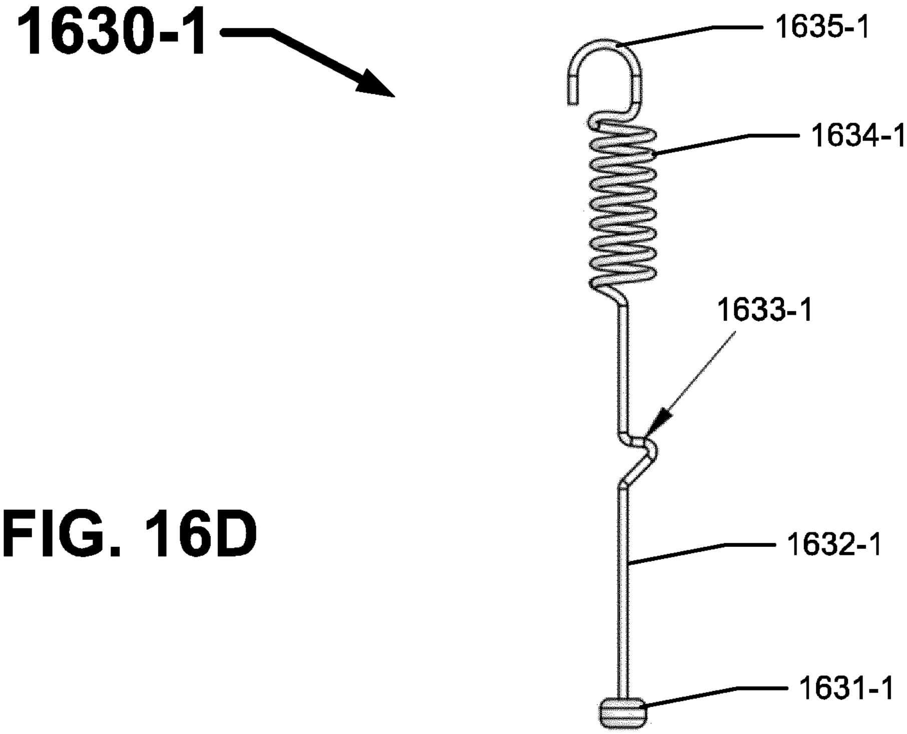
Figure 16E:
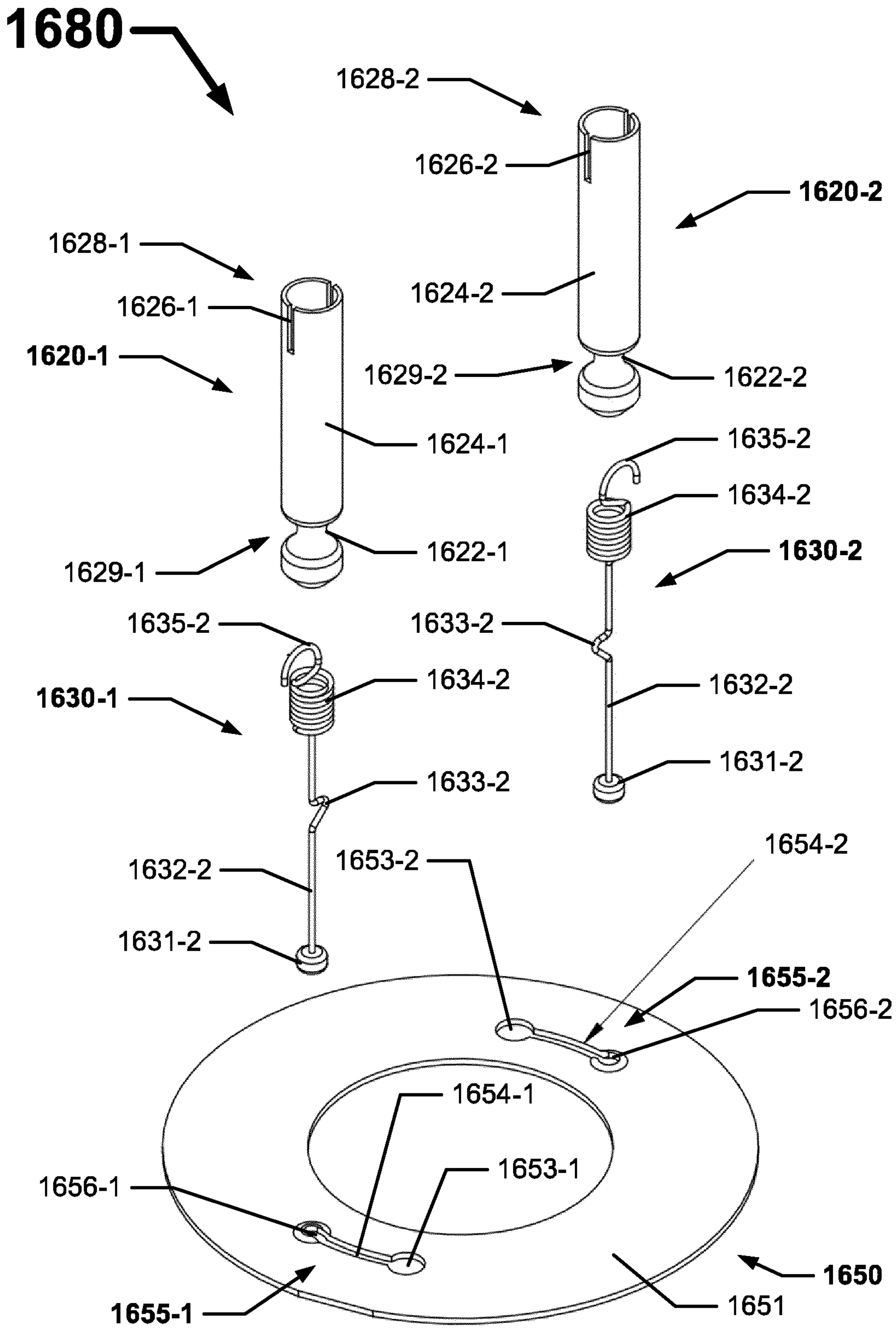
Figure 16F:
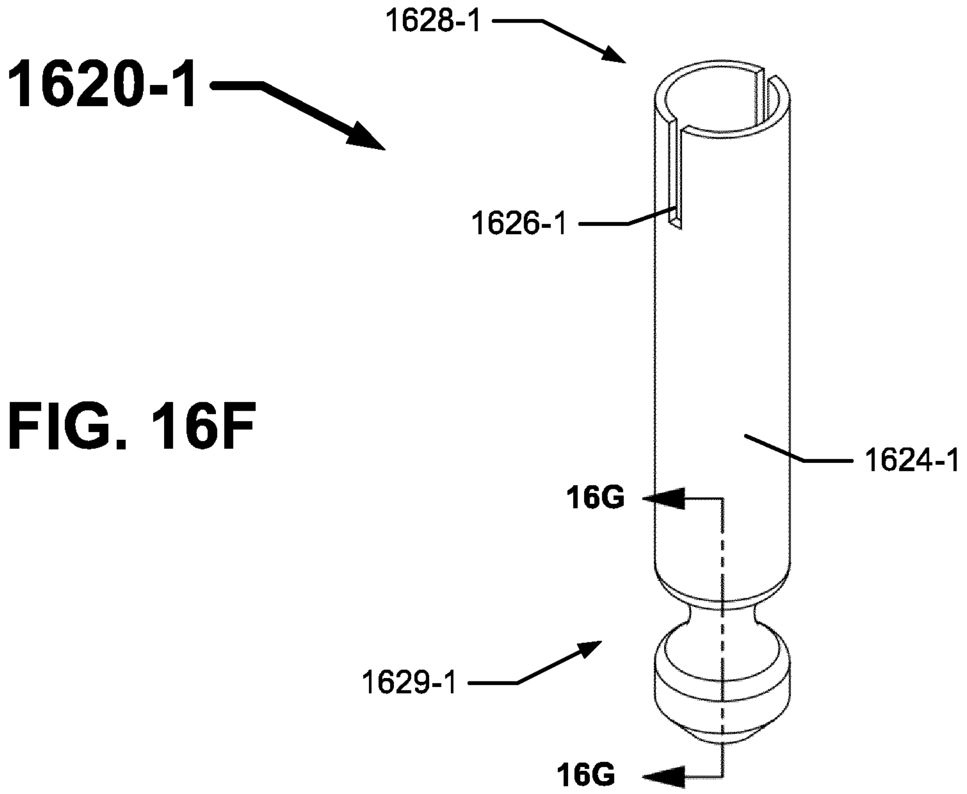
Figure 16G:
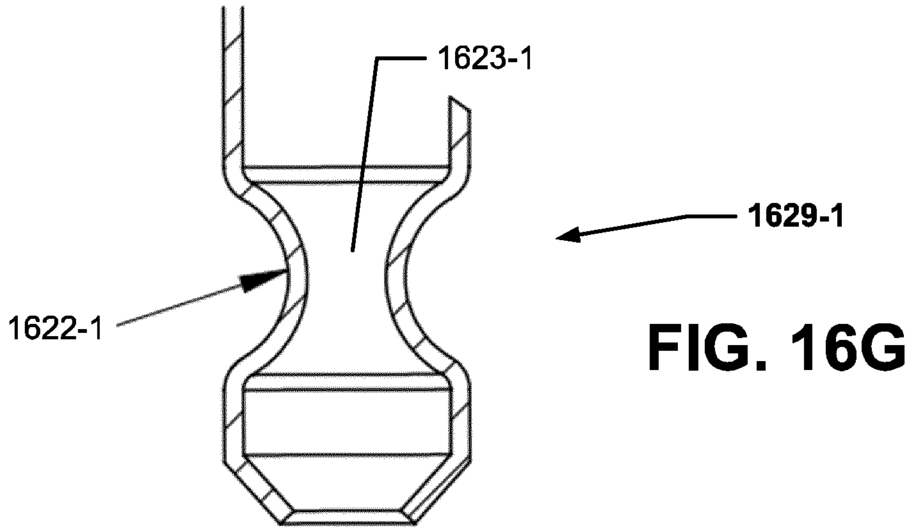

FIGS. 16A through 16G show various views of a system 1698 that includes yet another trim retention assembly 1680 in the loaded position according to certain example embodiments. Specifically, FIG. 16A shows a cross-sectional front view of the system 1698 with the trim retention assembly 1680 in the loaded position. FIG. 16B shows a detailed cross-sectional front view of part of the trim retention assembly 1680 of FIG. 16A. FIG. 16C shows a detailed cross-sectional front view of another part of the trim retention assembly 1680 of FIG. 16A. FIG. 16D shows a front view of a retention device 1630-1 of the trim retention assembly 1680 of FIG. 16A. FIG. 16E shows an exploded perspective view of the trim retention assembly 1680 of FIG. 16A. FIG. 16F shows a perspective view of an anchoring and retaining component 1620-1 of the trim retention assembly 1680 of FIG. 16A. FIG. 16G shows a detailed cross-sectional front view of part of the anchoring and retaining component 1620-1 of FIG. 16F.

FIGS. 17A and 17B show various views of the system 1698 of FIGS. 16A through 16G with the trim retention assembly 1680 in the unloaded position according to certain example embodiments. Specifically, FIG. 17A shows a cross-sectional front view of the system 1698 with the trim retention assembly 1680 in the unloaded position. FIG. 17B shows a detailed cross-sectional front view of part of the trim retention assembly 1680 of FIG. 17A.

Referring to FIGS. 1A through 17B, trim retention assembly 1680 of the system 1698 of FIGS. 16A through 17B includes two anchoring and retaining components 1620 (anchoring and retaining component 1620-1 and anchoring and retaining component 1620-2) and two retention devices 1630 (retention device 1630-1 and retention device 1630-2). The retention devices 1630 are configured substantially similar to each other, and the anchoring and retaining components 1620 are configured substantially similar to each other.

The retention device 1630-1 includes a luminaire anchor 1635-1 in the form of a hook, a resilient feature 1634-1 in the form of a tension spring, a luminaire retention feature 1633-1 in the form of a bump or shelf at the bottom of the resilient feature 1634-1 and at the top of an extension 1632-1, the extension 1632-1, and a trim coupling feature 1631-1 in the form of a magnetic feature. Similarly, the retention device 1630-2 includes a luminaire anchor 1635-2 in the form of a hook, a resilient feature 1634-2 in the form of a tension spring, a luminaire retention feature 1633-2 in the form of a bump or shelf at the bottom of the resilient feature 1634-2 and at the top of an extension 1632-2, the extension 1632-2, and a trim coupling feature 1631-2 in the form of a magnetic feature.

The luminaire anchors 1635, the resilient features 1634, the luminaire retention features 1633, and the extensions 1632 of the retention devices 1630 of FIGS. 16A through 17B are substantially the same as the luminaire anchors 335, the resilient features 334, the luminaire retention features 333, and the extensions 332 of the retention devices 330 of FIGS. 2 through 9, discussed above. The trim coupling feature 1631-1 and the of the trim coupling feature 1631-2 of the retention device 1630-1 are configured to couple to the trim assembly 1650. More specifically, the trim coupling feature 1631-1 of the retention device 1630-1 is configured to couple to a retention device coupling feature 1655-1 of the trim assembly 1650, and the trim coupling feature 1631-2 of the retention device 1630-2 is configured to couple to a retention device coupling feature 1655-2 of the trim assembly 1650.

The retention device coupling feature 1655-1 and the retention device coupling feature 1655-2 of the trim assembly 1650 are substantially similar to each other. Specifically, the retention device coupling feature 1655-1 includes a receiving aperture 1653-1 that traverses the trim flange 1651, a termination feature 1656-1 that traverses (at its center) and protrudes upward (adjacent to the center) in the trim flange 1651, and a key slot 1654-1 that traverses the trim flange 1651 and serves as a connection between the receiving aperture 1653-1 and the termination feature 1656-1. The characteristics (e.g., shape, size) of the receiving aperture 1653-1 are configured to receive (in this case, allow to pass therethrough) the trim coupling feature 1631-1 of the retention device 1630-1. The characteristics (e.g., width, shape) of the key slot 1654-1 are configured to receive the extension 1632-1 of the retention device 1630-1 and allow the extension 1632-1 to slide therethrough but are also configured to prevent the trim coupling feature 1631-1 from passing therethrough. The characteristics (e.g., shape, size) of the termination feature 1656-1 are configured to allow the extension 1632-1 to pass therethrough while also receiving and retaining the trim coupling feature 1631-1.

Similarly, the retention device coupling feature 1655-2 includes a receiving aperture 1653-2 that traverses the trim flange 1651, a termination feature 1656-2 that traverses (at its center) and protrudes upward (adjacent to the center) in the trim flange 1651, and a linear key slot 1654-2 that traverses the trim flange 1651 and serves as a connection between the receiving aperture 1653-2 and the termination feature 1656-2. The characteristics (e.g., shape, size) of the receiving aperture 1653-2 are configured to receive (in this case, allow to pass therethrough) the trim coupling feature 1631-2 of the retention device 1630-2. The characteristics (e.g., width, shape) of the key slot 1654-2 are configured to receive the extension 1632-2 of the retention device 1630-2 and allow the extension 1632-2 to slide therethrough but are also configured to prevent the trim coupling feature 1631-2 from passing therethrough. The characteristics (e.g., shape, size) of the termination feature 1656-2 are configured to allow the extension 1632-2 to pass therethrough while also receiving and retaining the trim coupling feature 1631-2.

In this case, when the retention devices 1630 are in the loaded position, as in FIG. 16A, the trim coupling features 1631 and the distal parts of the extensions 1632 of the retention devices 1630 are exposed in the volume of space 1638. A user can then raise the trim assembly 1650 in such a way that the trim coupling features 1631 pass through the receiving apertures 1653. When this occurs, the trim assembly 1650 can be rotated counter-clockwise (when viewed from below) so that the extensions 1632 pass along the key slots 1654 to the termination features 1656. At this point, the trim assembly 1650 can be lowered and released so that the trim assembly 1650 is supported by the engagement of the trim coupling features 1631 with the termination features 1656. When the retention devices 1630 are released from the loaded position to the unloaded position (in this case, by applying a sufficiently strong upward force to the trim coupling features 1631, which is transmitted through the substantially rigid extensions 1632 to the luminaire retention features 1633), the trim coupling features 1631 pull the trim assembly 1650 upward until the trim assembly 1650 abuts against the bottom surface of the structure 1659.

The anchoring and retaining component 1620-1 and anchoring and retaining component 1620-2 of the trim assembly 1650 are substantially similar to each other. Specifically, the anchoring and retaining component 1620-1 includes a body 1624-1 in the form of a cylinder, a retention device anchor 1628-1 in the form of one or more (in this case, two) vertical slots 1626-1 that extends downward from the top of the body 1624-1, and a retention device retaining feature 1629-1 in the form of a groove 1622-1 or a pinch point 1622-1 positioned toward the bottom of the body 1624-1.

The characteristics (e.g., shape, size) of the body 1624-1 are configured to receive (in this case, allow to pass therethrough) the various portions of the retention device 1630-1. For example, the body 1624-1 is wide enough and long enough to allow the resilient feature 1633-1 of the retention device 1630-1 to fully expand and contract without interference from the inner surface of the body 1624-1. The characteristics (e.g., width, shape) of the vertical slots 1626-1 of the retention device anchor 1628-1 are configured to receive and retain the luminaire anchor 1635-1 of the retention device 1630-1 as the retention device 1630-1 moves between the loaded position and the unloaded position. The characteristics (e.g., shape, size) of the groove 1622-1 of the retention device retaining feature 1629-1 are configured to retain the luminaire retention features 1633-1 of the retention device 1630-1 in the loaded position in the absence of a sufficiently large upward force and allow the extension 1632-1 to pass therethrough when the retention device 1630-1 is not in the loaded position (e.g., in the unloaded position, transitioning to or from the unloaded position).

Similarly, the anchoring and retaining component 1620-2 includes a body 1624-2 in the form of a cylinder, a retention device anchor 1628-2 in the form of one or more (in this case, two) vertical slots 1626-2 that extends downward from the top of the body 1624-2, and a retention device retaining feature 1629-2 in the form of a groove 1622-2 or a pinch point 1622-2 positioned toward the bottom of the body 1624-2. The characteristics (e.g., shape, size) of the body 1624-2 are configured to receive (in this case, allow to pass therethrough) the various portions of the retention device 1630-2. For example, the body 1624-2 is wide enough and long enough to allow the resilient feature 1633-2 of the retention device 1630-2 to fully expand and contract without interference from the inner surface of the body 1624-2.

The characteristics (e.g., width, shape) of the vertical slots 1626-2 of the retention device anchor 1628-2 are configured to receive and retain the luminaire anchor 1635-2 of the retention device 1630-2 as the retention device 1630-2 moves between the loaded position and the unloaded position. The characteristics (e.g., shape, size) of the groove 1622-2 of the retention device retaining feature 1629-2 are configured to retain the luminaire retention features 1633-2 of the retention device 1630-2 in the loaded position in the absence of a sufficiently large upward force and allow the extension 1632-2 to pass therethrough when the retention device 1630-2 is not in the loaded position (e.g., in the unloaded position, transitioning to or from the unloaded position).

Example embodiments can be used to allow a user to install, remove, and/or change the trim flange of a recessed light fixture when the recessed light fixture is installed with respect to a structure (e.g., a ceiling) more easily. Using example trim retention assemblies (or portions thereof), a trim flange can be installed, removed, and/or changed from a recessed luminaire (or any other type of luminaire) without the use of a tool (e.g., a screwdriver, a wrench), even if the recessed luminaire is installed (e.g., in a ceiling). Example embodiments can also provide flexibility as to the aesthetic appeal of the trim flange. Example embodiments can be used with recessed luminaires having any of a number of mounting systems and features. Example embodiments can be used in new installations of recessed luminaires as well as retrofitting existing luminaires. Example embodiments also provide a number of other benefits. Such other benefits can include, but are not limited to, increased ease of maintenance, greater ease of use, modularity, catering to user preferences, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A trim retention assembly for a recessed luminaire, the trim retention assembly comprising:
- a retention device anchor disposed in the recessed luminaire;
- a retention device retaining feature disposed in the recessed luminaire;
- a retention device coupling feature disposed on a trim; and
- at least one unitary a retention device comprising a luminaire anchor, a resilient feature, a luminaire retention feature, and a trim coupling feature, wherein the luminaire anchor is coupled to the retention device anchor, wherein the trim coupling feature is coupled to the retention device coupling feature, wherein the resilient feature has a loaded position and an unloaded position, wherein the retention device retaining feature holds the resilient feature in the loaded position by engaging the luminaire retention feature, wherein the luminaire retention feature is in the form of a protrusion or shelf at a bottom of the resilient feature and above the trim coupling feature, wherein the trim coupling feature is disposed below a structure when the resilient feature is in the loaded position, thereby allowing the trim coupling feature to become coupled to the retention device coupling feature, and wherein the resilient feature pulls the trim against the structure when resilient feature is in the unloaded position, wherein the luminaire retention feature is disengaged with the retention device retaining feature when the resilient feature is in the unloaded position.

2. The trim retention assembly of claim 1, wherein the resilient feature of the retention device comprises a spring.

3. The trim retention assembly of claim 1, wherein the resilient feature of the retention device comprises a retractable mechanism.

4. The trim retention assembly of claim 1, wherein the retention device retaining feature releases the retention device from the loaded position to the unloaded position when a particular movement is translated to the retention device.

5. The trim retention assembly of claim 1, wherein the retention device anchor is disposed toward a top end of a bracket, and wherein the retention device retaining feature is disposed toward a bottom end of the bracket.

6. The trim retention assembly of claim 5, wherein the retention device anchor comprises an aperture that traverses the bracket, and wherein the retention device retaining feature comprises a body, a slotted aperture that traverses the body, and a retention slot in the body adjacent to the slotted aperture.

7. The trim retention assembly of claim 6, wherein the luminaire retention feature of the retention device comprises a protrusion that engages the retention slot when the resilient feature is in the loaded position.

8. The trim retention assembly of claim 7, wherein the protrusion releases from the retention slot when the trim coupling feature is pulled by a downward force, and wherein the resilient feature retracts the protrusion through the slotted aperture in the body of the retention device retaining feature and moves the retention device toward the unloaded position when the downward force is released.

9. The trim retention assembly of claim 1, wherein the retention device coupling feature is coupled to a collar of the trim.

10. The trim retention assembly of claim 1, wherein the trim coupling feature comprises a magnet.

11. A recessed luminaire mounted to a structure, the recessed luminaire comprising:
- a housing comprising a housing wall that forms a cavity therein;
- a trim assembly comprising a trim and a retention device coupling feature disposed on the trim collar; and
- a trim retention assembly comprising:
  - a retention device anchor disposed in the cavity of the housing;
  - a retention device retaining feature disposed in the cavity of the housing; and
  - a retention device disposed in the cavity of the housing, wherein the retention device comprises a luminaire anchor, a resilient feature, a luminaire retention feature, and a trim coupling feature, wherein the luminaire anchor is coupled to the retention device anchor, wherein the trim coupling feature is coupled to the retention device coupling feature, wherein the resilient feature has a loaded position and an unloaded position, wherein the retention device retaining feature holds the resilient feature in the loaded position by engaging the luminaire retention feature, wherein the luminaire retention feature is in the form of a protrusion or shelf formed from at a bottom of the resilient feature and above the trim coupling feature, thereby allowing the trim coupling feature to become coupled to the retention device coupling feature, and wherein the resilient feature pulls the trim against the structure when resilient feature is in the unloaded position, wherein the luminaire retention feature is disengaged with the retention device retaining feature when the resilient feature is in the unloaded position.

12. The recessed luminaire of claim 11, wherein the trim coupling feature is disposed outside the cavity and below the structure when the resilient feature is in the loaded position, and wherein the trim coupling feature is disposed within the cavity and above the structure when the resilient feature is in the unloaded position.

13. The recessed luminaire of claim 11, wherein the housing is a can.

14. The recessed luminaire of claim 11, wherein the trim retention assembly further comprises a second retention device disposed in the cavity of the housing, wherein the second retention device comprises a second luminaire anchor, a second resilient feature, a second luminaire retention feature, and a second trim coupling feature, wherein the second luminaire anchor is coupled to a second retention device anchor disposed in the cavity of the housing, wherein the second trim coupling feature is coupled to a second retention device coupling feature disposed on the trim, wherein the second resilient feature has the loaded position and the unloaded position, wherein the second retention device retaining feature holds the second resilient feature in the loaded position, wherein the second trim coupling feature is disposed below the structure when the second resilient feature is in the loaded position, and wherein the second resilient feature further pulls the trim against the structure when second resilient feature is in the unloaded position.

15. The recessed luminaire of claim 11, wherein the retention device and the second retention device are located substantially equidistantly from each other with respect to the housing.

* * * * *